United States Patent [19]

Umezawa et al.

[11] 4,227,224
[45] Oct. 7, 1980

[54] CASSETTE TAPE RECORDING/REPRODUCING APPARATUS

[75] Inventors: Hiroyuki Umezawa; Yukio Ito; Kazuki Takai; Hitoshi Okada, all of Toda, Japan

[73] Assignee: Clarion Co., Ltd., Tokyo, Japan

[21] Appl. No.: 17,373

[22] Filed: Mar. 5, 1979

[30] Foreign Application Priority Data

| Mar. 6, 1978 | [JP] | Japan | 53/27451[U] |
| Mar. 14, 1978 | [JP] | Japan | 53/29153 |
| Mar. 14, 1978 | [JP] | Japan | 53/29154 |
| Mar. 17, 1978 | [JP] | Japan | 53/30543 |
| Mar. 30, 1978 | [JP] | Japan | 53/35991 |

[51] Int. Cl.² .................... G11B 15/24; G11B 15/10
[52] U.S. Cl. ........................... 360/96.5; 360/137
[58] Field of Search ..................... 360/96.5–96.6, 360/96.1, 93, 137, 105; 242/197–200

[56] References Cited

U.S. PATENT DOCUMENTS

| 3,669,457 | 6/1972 | Nozawa et al. | 360/93 |
| 4,065,800 | 12/1977 | Wilson et al. | 360/96.5 |
| 4,071,860 | 1/1978 | Watanabe et al. | 360/96.5 |
| 4,099,213 | 7/1978 | Schatteman | 360/96.5 |
| 4,163,997 | 8/1979 | Sugihara | 360/96.5 |

Primary Examiner—Alfred H. Eddleman
Attorney, Agent, or Firm—Wallenstein, Spangenberg, Hattis & Strampel

[57] ABSTRACT

A cassette tape recording/reproducing apparatus which is so adapted that after a cassette is horizontally pushed deep into a pack guide, the pack guide is lowered in a vertical direction to set the cassette in a recording/reproducing position on a bottom plate of the apparatus, which apparatus is characterized in:

that an ejecting plate and a slide plate are provided along the pack guide so as to slide in the forward and the backward direction of the apparatus, and a lock plate is provided for locking the ejecting plate and the slide plate in their retired positions, respectively, said lock plate being adapted to lock, at a time, either one of the ejecting plate and the slide plate, preventing the same from moving and allow the other to move forwardly or backwardly;

that a power plate is provided also along the pack guide, which plate is movable in the forward and the backward direction of the apparatus, provided with a set spring for normally urging the power plate in the retreating direction, and engageable with the slide plate through a rack-pinion mechanism, and means for releasing the engagement between the slide plate and the power plate when the cassette is ejected is provided;

that the slide plate has an ejecting spring for normally urging the slide plate in the advancing direction, the force of which is smaller than that of the set spring provided on the power plate; and that the ejecting plate is interlocked with a mechanism for lowering or raising the pack guide so that the pack guide is lowered or raised according to the advance or retreat of the ejecting plate.

22 Claims, 32 Drawing Figures

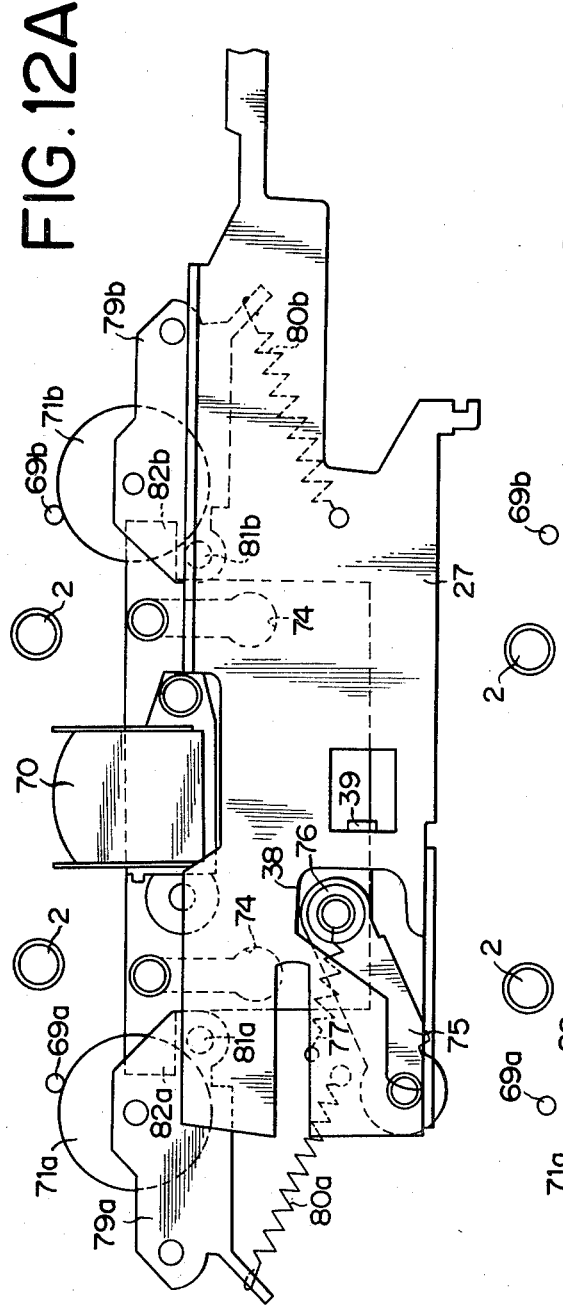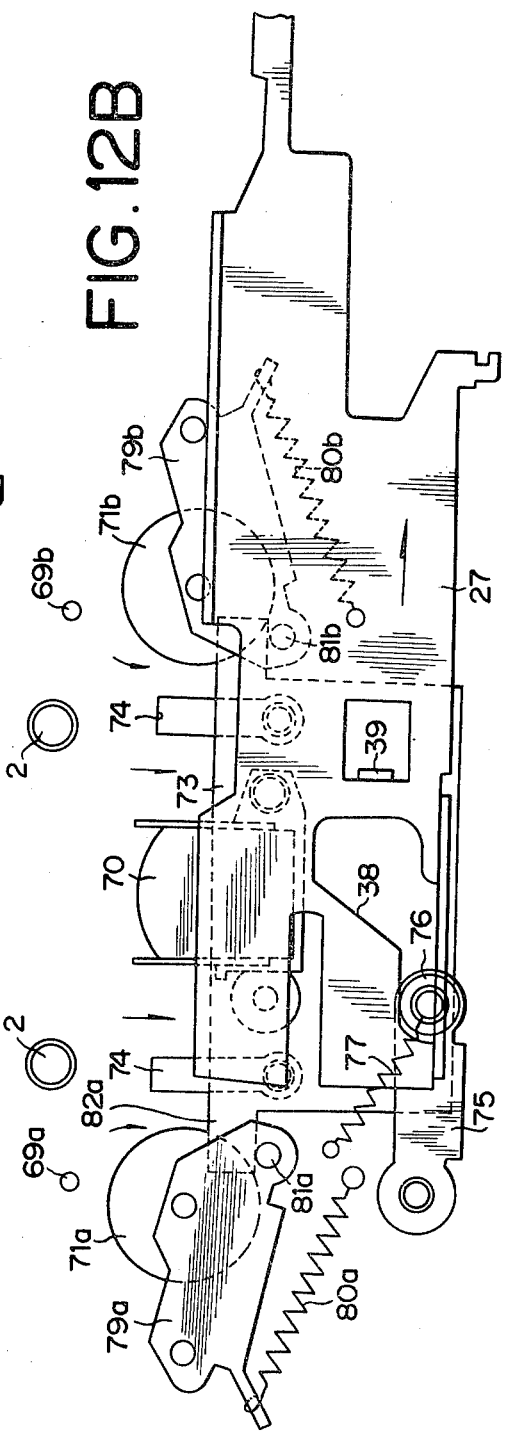

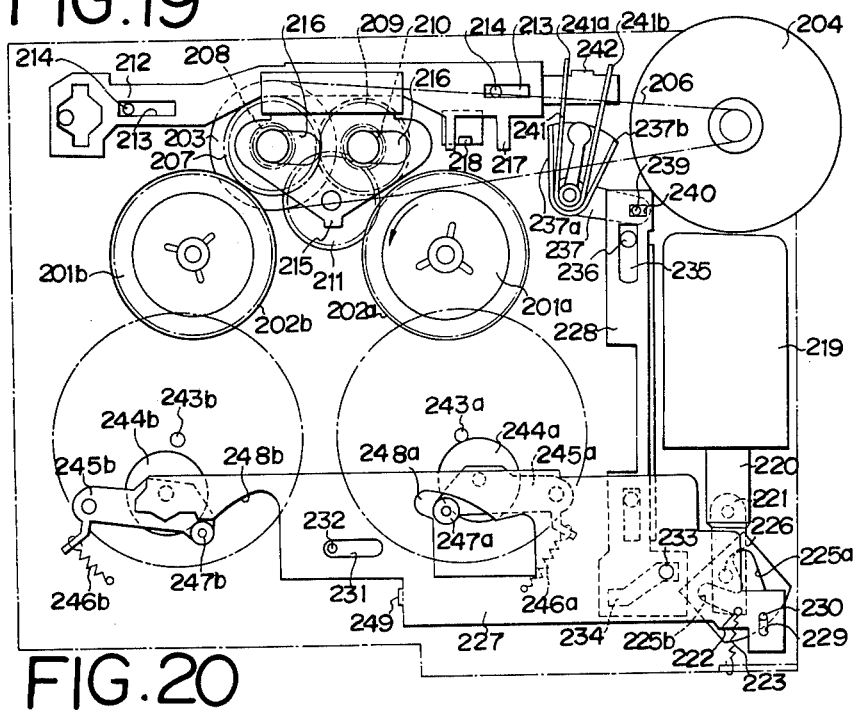
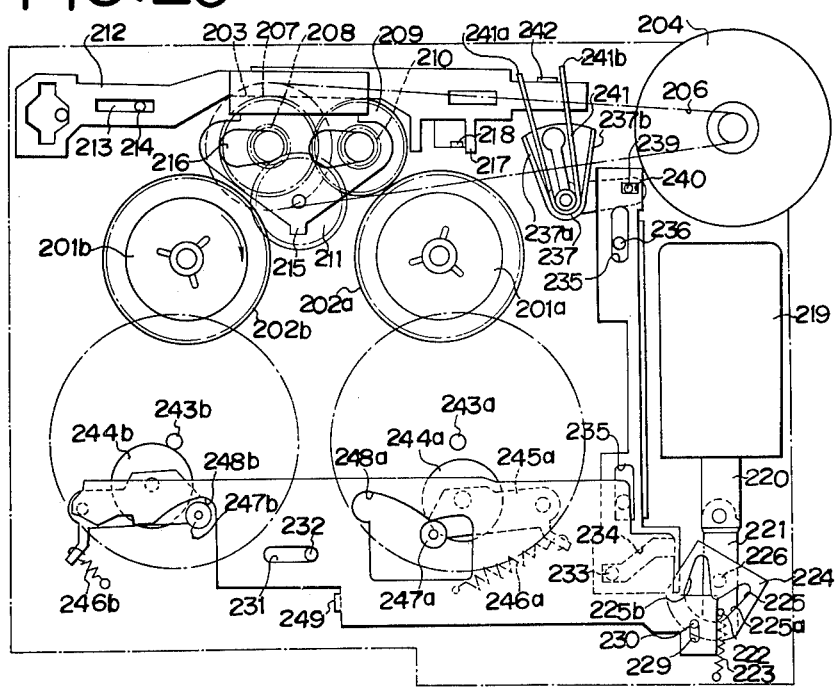

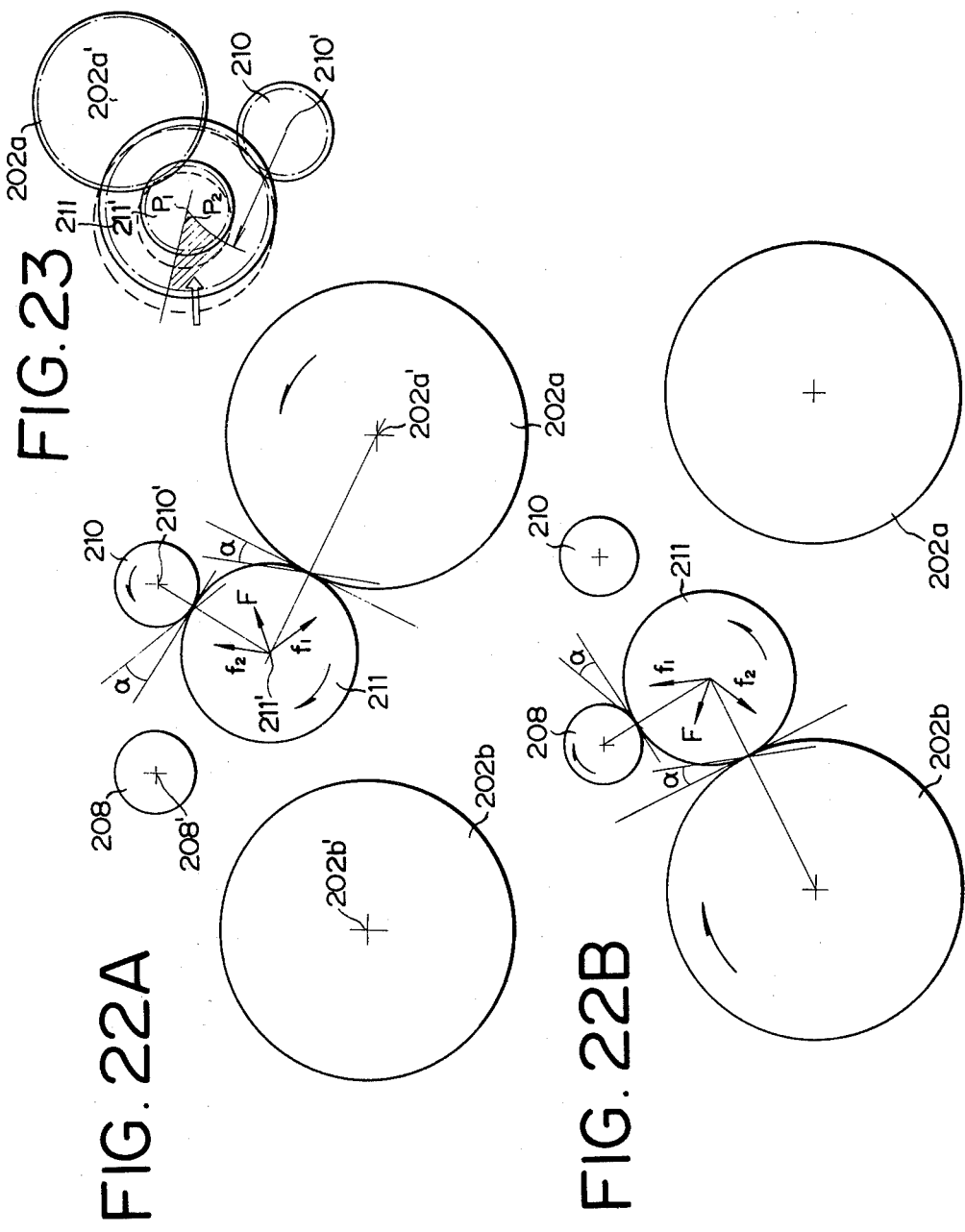

CASSETTE TAPE RECORDING/REPRODUCING APPARATUS

FIELD AND BACKGROUND OF THE INVENTION

This invention generally relates to a cassette tape recording/reproducing apparatus which is so adapted that after a cassette is horizontally pushed deep in a pack guide, the pack guide is lowered in a vertical direction to set the cassette in a recording/reproducing position on a bottom plate of the apparatus. More particularly, this invention relates to a cassette tape recording/reproducing apparatus of the aforesaid type which is capable of carrying out all operations for cassette loading and unloading including putting-in of a cassette and ejection thereof, in a predetermined sequence and with appropriate timing, by employing and organically combining specific mechanisms (1) to (3) as summarized in the following:

(1) A drawing mechanism which automatically draws a cassette into the interior of the pack guide which has been partially or halfway put in the pack guide.

(2) A pack guide lowering and raising mechanism which lowers the cassette drawn into the interior of the pack guide into a recording/reproducing position together with the pack guide and raises the cassette from the recording/reproducing position with the pack guide.

(3) An ejecting mechanism which projects the cassette in the pack guide out of the front of the apparatus when the recording/reproducing operation has been completed.

The cassette tape recording/reproducing mechanism of the present invention may further employ, in combination with the mechanisms (1) to (3), a mechanism for pressing and releasing a head and pinch rollers relative to the cassette set in the recording/reproducing position. According to this arrangement, the head and the pinch rollers can be pressed against and disengaged from the cassette with appropriate timing according to the loading and unloading of the cassette.

There have been proposed various systems for loading a cassette. In accordance with one system of them, a cassette is first put in a pack guide from the front of an apparatus and pushed into an innermost position along the pack guide, and then lowered in the vertical direction to be set in a recording/reproducing position. This system has such an advantage that the cassette is more accurately loaded over other systems, since the cassette is adapted to be lowered vertically and a positioning pin provided on the apparatus can be easily received by a guide slot formed on the cassette. However, according to this system, the cassette should be pushed until the forward end of the cassette is fully depressed from the apparatus. In general, however, an inlet of the pack guide is too small for fingers to be put in. Furthermore, on the front of the pack guide there are provided various members such as an apparatus frame, escutcheon, etc. Thus, it is very difficult to push the cassette into the foremost position by hand. To solve this problem, the recording/reproducing apparatus of this type generally employs a cassette drawing mechanism. The cassette drawing mechanism is then so adapted that when the cassette is pushed halfway into the pack guide, the cassette is automatically drawn into the interior of the apparatus by a drawing force stored in the apparatus during the initial pushing operation of the cassette, and set in a recording/reproducing position.

This known cassette drawing mechanism, however, has the following structural and functional problems:

(a) The cassette drawing mechanism utilizes a pushing force applied when the cassette is pushed halfway by hand. This force is stored in the form of an energy for the drawing mechanism and used to draw the cassette when the cassette passes a given point in the retreat course thereof. However, the pushing force thus applied is usually stored in the form of an energy for pushing out the cassette forwardly. To utilize this force as an energy for drawing the cassette, the acting direction of the energy is required to be changed using a link mechanism, a rack-pinion mechanism or cam means. Accordingly, where the tape recording/reproducing apparatus employs such a cassette drawing mechanism therein, the structure will be complicated and the overall size is increased because of the complicated mechanism. This problem is most serious in a car audio unit such as a car stereo because a space for mounting the unit is very limited.

(b) In the tape recording/reproducing apparatus with the cassette drawing mechanism, it is required to automatically effect drawing of the cassette pushed halfway into the pack guide, lowering into the recording/reproducing position and pressing of the head etc. against the cassette in a predetermined sequence and with appropriate timing. However, it has been considerqbly difficult to control these operations so as to be effected accurately. Heretofore, these operations are controlled by engaging or disengaging, for example, projections, levers, slots or grooves provided on the components of the mechanism. However, where the tape recording/reproducing apparatus is formed thinner and small-sized, engagement between the components becomes inaccurate and unstable and there is a possibility that such engagement is undesirably released causing misoperation of the mechanism. Furthermore, especially in case of a car audio unit such as a car stereo, engagement, locking or connection between the components are likely to be released due to vibration caused by a running car.

(c) Furthermore, in the tape recording/reproducing apparatus of this type, there is provided a mechanism to push out the cassette set in the interior of the apparatus so that an operator of the apparatus can easily take the cassette out of the apparatus. The force for ejecting the cassette is an energy stored during the pushing operation for cassette loading. In this connection, it is to be noted that the apparatus should be specifically arranged so that this stored ejecting force will not hinder the operation of the drawing mechanism when the cassette is loaded, and, on the contrary, the drawing mechanism will not prevent proper ejecting operation. Accordingly, there has been long desired an apparatus which can properly control the operational relationship between the ejecting mechanism and the drawing mechanism and yet can be formed small and thin.

It is therefore an object of the present invention to provide a cassette tape recording/reproducing apparatus having a cassette loading control mechanism which assures proper and smooth operations of various mechanisms provided therein, especially, a cassette drawing mechanism, an ejecting mechanism etc. in cassette loading or unloading, and yet is suitable for thin and compact formation of the apparatus.

BRIEF DESCRIPTION OF THE DRAWINGS

FIGS. 12A and 12B are plan views showing the interlocking relation between the ejecting plate and a head plate.

FIGS. 19 and 20 are plan views showing one form of idler gear switching mechanism for a tape player of the present invention.

FIGS. 22A and 22B are plan views showing another form of idler gear switching mechanism.

FIG. 23 is a plan view showing directions of forces applied to the idler gear in the mechanism shown in FIGS. 19 and 20.

PREFERRED EMBODIMENTS OF THE INVENTION

Figure 1:
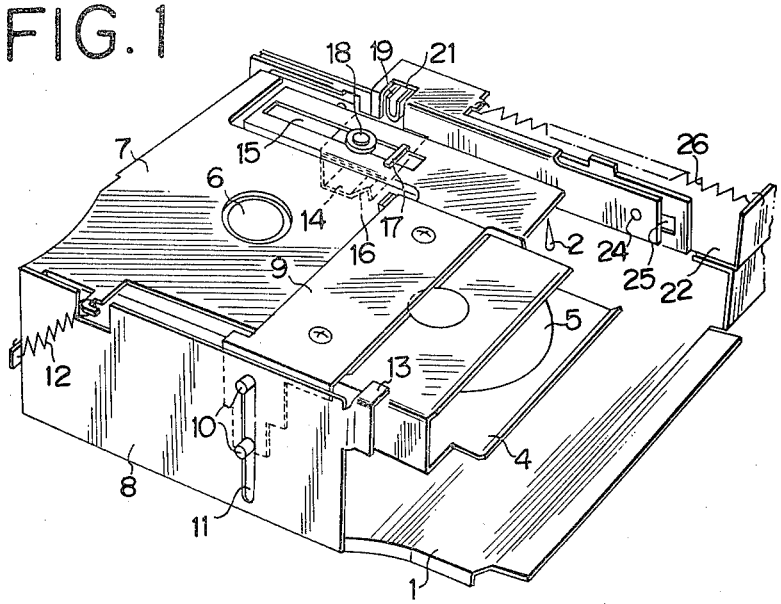
FIG. 1 is a perspective view of one form of a pack guide portion in a tape player employing a cassette loading control mechanism according to the present invention.

Referring now to the drawings, more particularly to FIGS. 1 through 14, there is illustrated a preferred embodiment of the present invention.

In the figures, numeral 1 designates a bottom plate of a tape player. A cassette C is adapted to be set in a recording/reproducing position on said bottom plate 1. On said bottom plate 1 are provided upright cassette positioning pins 2, 2 and a pair of reel shafts 3, 3 to be rotated by a driving mechanism provided under said bottom plate 1. A pack guide 4 which is movable up and down is provided above said reel shafts 3, 3 on the bottom plate 1. The pack guide 4 is shaped in a rectangular parallelepiped with a front side and a side facing a cassette drawing mechanism opened. An opening 5 is formed on the lower plate of the pack guide 4 for exposing the bottom face of the cassette C, especially holes thereof into which the reel shafts are to be inserted, and a pair of openings 6, 6 are provided on the upper plate of said pack guide 4 at positions thereof corresponding to the reel shaft inserting holes.

Figure 2:
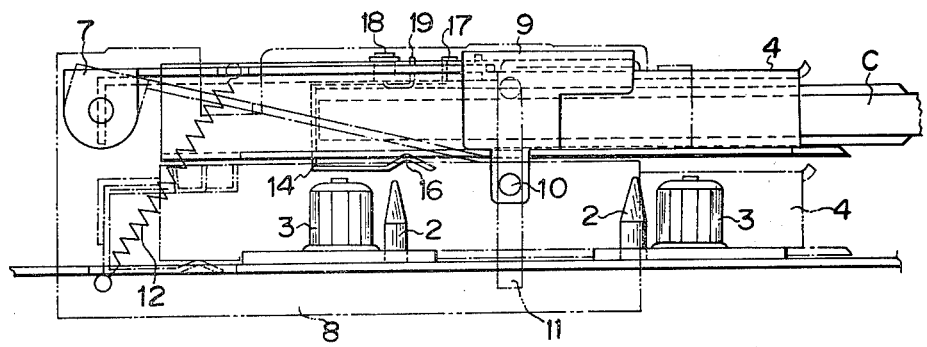
FIG. 2 is a side elevational view of said portion shown in FIG. 1.

A guide arm 7 is superposed on the upper plate of the pack guide 4. Said guide arm 7 is pivotally mounted at its rear end on a sidewall 8 standing uprightly along a side of said bottom plate 1 and flexibly connected at its forward end to the pack guide 4 intermediate its upper plate. Stated illustratively, the pack guide 4 and the guide arm 7 are adapted so that when said guide arm 7 is rotated up and down around the pivotal point where it is connected to the sidewall 8, the pack guide 4 connected to the forward end of said guide arm is allowed to be pulled up or brought down, keeping its horizontal position. A guide clamp 9 is fixed to the upper plate of the pack guide 4 as illustrated in FIGS. 1 and 2. Said guide clamp 9 has a side portion bent into an L-shape, where a pair of guide pins 10, 10 are provided. Said pins 10, 10 are adapted to engage with a guide slot 11 formed on the sidewall 8 extending in the vertical direction, to assure accurate movement of the pack guide 4 which is desired to be pulled up and brought down in the vertical direction. A spring 12 is preferably provided between the guide arm 7 and the sidewall 8 to positively holding said pack guide 4 at its lowermost position. In addition, a regulating member 13 is provided at a forward end of the sidewall 8 and adapted to abut against the upper plate of the pack guide 4 when the latter is pulled up to position the uppermost position thereof.

In the pack guide 4, a cassette catch 14 is provided so as to move in the cassette loading direction. More specifically, a guide slot 15 is formed on the upper plate of the pack guide 4 along a side of the cassette drawing mechanism, and a head portion of said cassette catch 14 is movably fitted in said guide slot 15. The cassette catch 14 is made of a ]-shaped member with a front portion opened and a lower portion curved upwardly as depicted in FIG. 1 to form a cassette holding portion 16. On the upper face of said cassette catch 14 are provided a projecting member 17 and a guide pin 18 engaged with sides of the guide slot 15. With the projecting member 17 and the guide pin 18, the cassette catch 14 is slidably mounted on the pack guide 4. A pressing projection 19 is provided on a side of the cassette catch 14 confronting the cassette drawing mechanism. Said pressing projection 19 is engaged with a rear end portion of a slide plate 20 disposed along the pack guide 4 in parallel with the loading direction of the cassette C.

Figure 3:
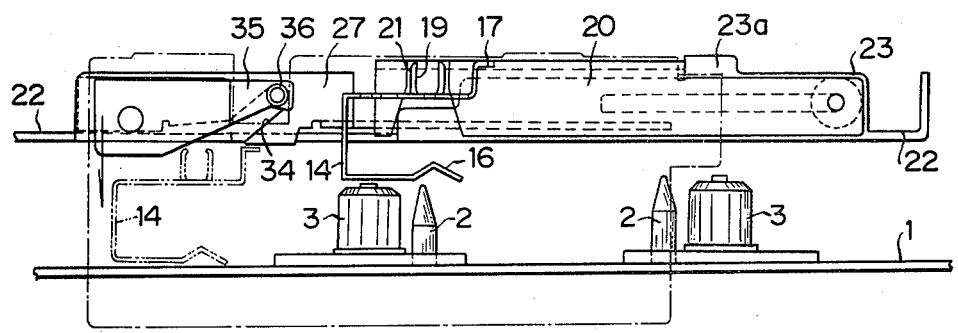
FIGS. 3 and 4 are side elevational views showing the operation of a slide plate and an ejecting plate in the cassette loading control mechanism of the present invention.
Figure 4:
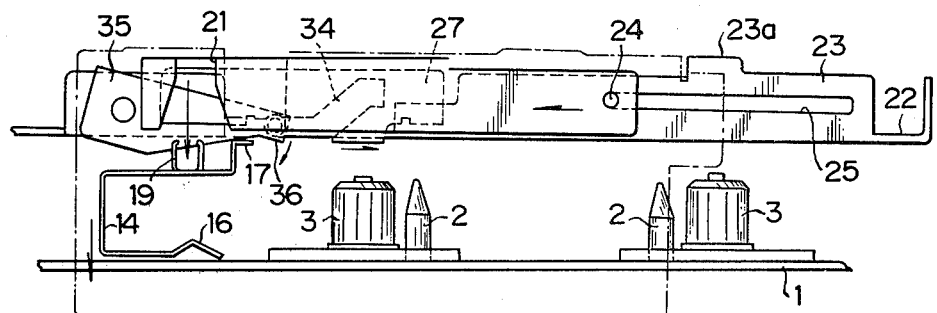

More specifically, as shown in FIGS. 3 and 4, a vertically extending guide groove 21 is formed at the rear end portion of the slide plate 20. The pressing projection 19 is engaged with said guide groove 21 slidably in the vertical direction. This pressing projection 19 is formed, for example, by projecting laterally the upper plate of the cassette catch 14 and bending the projected portion into a U-shape. However, the configuration of the pressing projection 19 is not limited to the aforesaid one and said projection 19 may be formed of a separate member such as a pin fixed to the cassette catch 14.

The slide plate 20 with which said pressing projection 19 of the cassette catch 14 is engaged constitutes a part of the cassette drawing mechanism provided along the pack holder 4. By said slide plate 20, a pressing force exerted during the loading of the cassette is transmitted to the drawing mechanism, and an energy stored by said drawing mechanism is transmitted to the cassette C for effecting loading and unloading thereof.

The base plate 22 and the cassette drawing mechanism will be described in detail. The cassette drawing mechanism is mounted on the base plate 22 provided, in a plane parallel to the plane within which the bottom plate 1 exists, along the pack holder 4. Under said base plate 22, i.e., at a space between said base plate 22 and the bottom plate 1, are disposed a recording/reproducing head, a pinch roller, etc. The specific arrangement of these members will be mentioned later.

The base plate 22 has a guide plate 23 formed on a side thereof which confronts the pack holder 4 and extending from the forward portion of said base plate 22 to the intermediate portion thereof as depicted in FIG. 1. The slide plate 20 is slidably mounted on said guide plate 23. Stated illustratively, the slide plate 20 is combined to the guide plate 23 on a side thereof which faces said pack holder 4, and a guide pin 24 provided at the forward end portion of the slide plate 20 is reciprocatably engaged with a guide slot 25 formed on the guide plate 23. The slide plate 20 on the guide plate 23 is normally urged forwardly (toward the front of the tape player). To this end, an ejecting spring 26 is provided between the forward end of the slide plate 20 and the foremost edge of the base plate 22. A projection 23a is formed on an upper edge of the guide plate 23 and adapted to act as a stopper for determining the foremost position of the slide plate 20.

Figure 5:
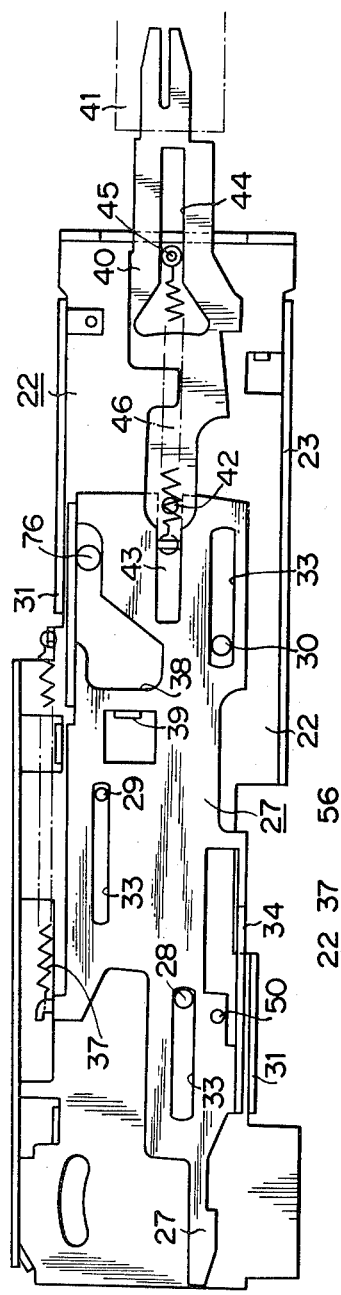
FIG. 5 is a plan view of the ejecting plate shown in FIGS. 3 and 4.

On the other hand, an ejecting plate 27 arranged as shown in FIG. 5 is superposed on the upper face of the base plate 22. Said ejecting plate 27 is adapted to be guided by three pins (more specifically, a pivotal pin 28 for a lock plate, a pivotal pin 29 for a kick plate as will be described later and a guide pin 30 for the ejecting plate) provided so as to project on the base plate 22 and side plates 31, 31 bent upwardly at opposite sides of the base plate 22. Thus, the ejecting plate 27 is adapted to slide on the base plate 22 in the cassette loading direction. Numeral 33 designates three guide slots formed on the ejecting plate 27 in which the aforesaid pins 28, 29, 30 are fitted, respectively.

The ejecting plate 27 has, at its rear side portion which faces said pack guide 4, an upright portion bent along the side plate 31 of the base plate 22. At this upright portion, an inclined groove 34 for regulating the up and down movement of said guide arm 7 is provided. In this respect, the inclined groove 34 is shaped so as to extend diagonally from the lower side of the ejecting plate 27 towards the upper forward portion of said ejecting plate 27 (forward portion of the tape player) as depicted in FIGS. 3 and 4. In said inclined groove 34 is received a guide roller 36 provided at a tip end of a turning lever 35 on the guide arm 7. In this case, if the inclined groove 34 is shaped so that it may have a steep slope at its upper portion and a gentle slope at its lower portion, the guide arm 7 brought down is more positively held in the lowered position as will be mentioned in detail later. The ejecting plate 27 is provided with a spring 37 normally urging said ejecting plate 27 in the forward direction. This spring 37 is provided for example between the rear end of the ejecting plate 37 and a side of the base plate remote from said pack guide 4.

Said ejecting plate 27 is further provided with components of a mechanism for pressing the recording/reproducing head and members for controlling a tape feed direction changing mechanism which are separately provided from the cassette drawing mechanism. Stated illustratively, an L-shaped cutout formed at a forward portion of said ejecting plate 27 is adapted for engagement with a guide roller of a head plate, and a lug 39 formed downwardly intermediate the ejecting plate 27 is adapted to push a tape feed direction switching lever provided under the base plate 22. The relations between the ejecting plate 27, the head pressing mechanism and the tape feed direction switching mechanism will be explained later.

At the forward end portion of said ejecting plate 27 on the base plate 22, a push lever 40 is provided so as to slide in the backward and forward direction as shown in FIG. 5. The forward end of the push lever 40 is projected forwardly from the forward end of the base plate 22 and attached with a push button 41. The rear portion of said push lever 40 is provided with a guide pin 42 extending downwardly which pin is engaged with a guide slot 43 formed at the forward portion of the ejecting plate 27. Said push lever 40 is further provided with a guide slot 44. A shaft 45 provided on the base plate 22 is received in said guide slot 44 so that the push lever 40 reciprocates on the base plate 22 while being guided by said shaft 45 and said guide groove 43 of the ejecting plate 27. Said push lever 40 is further provided with a spring 46 for normally urging the same in the forward direction. The spring 46 is provided between the rear end of the push lever 40 and the shaft 45.

Figure 6:
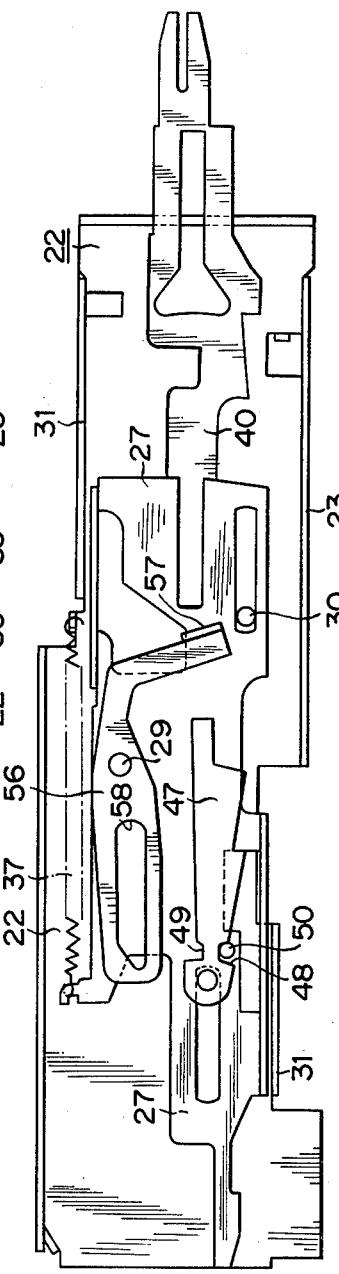
FIG. 6 is a plan view of a lock plate and a kick plate in the cassette loading control mechanism.

On the other hand, a lock plate and a kick plate extending in the longitudinal direction of the ejecting plate 27 are juxtaposedly mounted on the upper face thereof as shown in FIG. 6.

The lock plate 47 is formed in a sectorial shape expanding forwardly and connected at its rear end portion by the pivotal pin 28 projecting upwardly from the ejecting plate 27 through the guide slot 33. In the vicinity of the pivotal point of the lock plate 47, a pair of recessed portions 48, 49 are formed. The recessed portion 48 located on a side of said lock plate which faces the pack guide 4 is engaged with an ejecting plate lock pin 50 projectingly provided on the ejecting plate 27. On the other hand, the recessed portion 49 on the opposite side is engaged with a slide plate lock pin 51 provided on the slide plate 20. For example, said lock plate 47 has at its side which faces the pack guide 4 a stepped profile and at the opposite side a linear outline.

Figure 7:
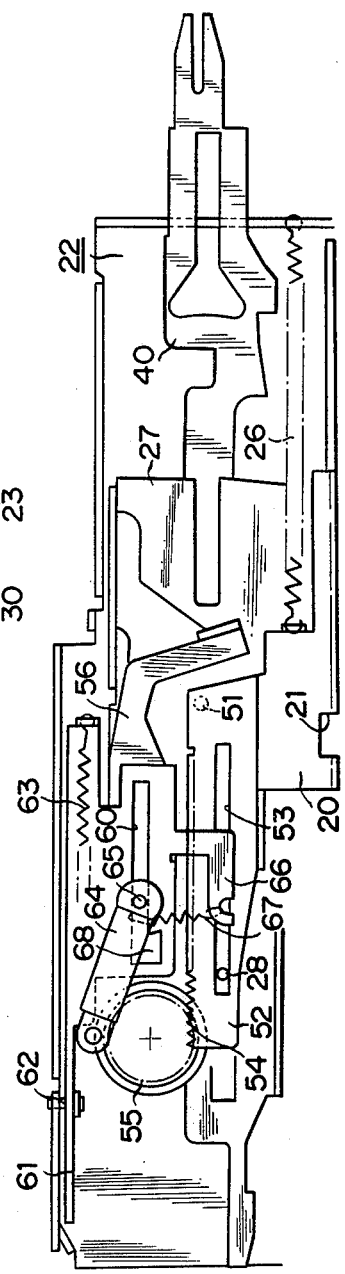
FIG. 7 is a plan view of a power plate and a slide plate in the cassette loading control mechanism.

A gear plate 52 is provided on the upper face of the lock plate 47 as shown in FIG. 7. Said gear plate 52 is integrally formed with the rear portion of the slide plate 20. Stated illustratively, in the present invention, the upper portion of the slide plate 20 located on the side closer to the pack guide 4 than the guide plate 23 on the base plate 22 is extended to the cassette drawing mechanism striding said guide plate 23. With said extended portion is formed integrally the gear plate 52 as referred to above. The gear plate 52 has a guide slot 53 formed along the length thereof and the tip end of the lock plate connecting pin 28 is inserted in said guide slot 53. The gear plate 52 further has a rack gear 54 at its outer side. The rack gear 54 is adapted to be in mesh with a pinion 55 disposed outside of the lock plate 47 (at the rear of the kick plate juxtaposed with said lock plate 47). The slide plate lock pin 51 engaged with the recessed portion 49 of the lock plate 47 is provided on the lower face of the base portion of said gear plate 52 and adapted to slide following the outer edge of the lock plate 47 according to the reciprocation of the gear plate 52 (slide plate 20) in the backward and forward direction.

On the other hand, the kick plate 56 juxtaposedly mounted outside of the lock plate 47 is pivotally supported, as shown in FIG. 6, intermediate thereof, by the pivotal pin 29 projected from the upper face of the ejecting plate 27. The forward portion of the kick plate 56 is bent inwardly (toward the pack guide) to form an L-shaped portion and extends into front of the lockplate 47. At the foremost position of the kick plate 56 is formed a lug 57 which is adapted to abut against the rear end of the push lever 40 provided in front of the ejecting plate 27. The kick plate 56 extends rearwardly as far as the lock plate 47 and has at a rear portion thereof a guide slot 58 extending generally to the pivotal pin 29.

On the upper face of the kick plate 56 is disposed a power plate 59 as shown in FIG. 7. Said power plate 59 is adapted to slide backwardly and forwardly by means of a guide slot 60 formed thereon along the length thereof and the pivotal pin 28 pivotally carrying the kick plate 56 and engaged at its tip end with the slot 60. To assure smooth slide of the power plate 59, it is preferred that the rear portion of the power plate 59 be bent upwardly along the sidewall 31 of the base plate 22 and the bent portion have a guide slot 61 engageable with a guide pin 62 provided on the sidewall 31 as illustrated in the figure. A set spring 63 is provided between the forward end of the power plate 59 and the side plate 31 of the base plate 22 normally to urge the power plate 59 rearwardly, to wit, in the retreating direction. The set spring 63 is stronger than the ejecting spring 26.

A pushing arm 64 for pushing said power plate 59 forwardly is pivotally connected at its rear end to the upper face of the pinion 55. The forward end of the pushing arm 64 is extended over the power plate 59 and provided with a guide pin 65 on its lower face. The guide pin 65 is fitted in the guide slot 60 of the power plate 59 and the guide slot 58 of the kick plate 56 disposed thereunder. The power plate 59 further has a hook portion 66 formed in an L-shape on a side thereof closer to the pack guide 4. A spring 67 is mounted between the hook 68 and the tip end of the pushing arm 64 to normally pull the guide pin 65 of the pushing arm 64 towards the pack guide 4. In addition, a recessed portion 68 extending towards the pack guide 4 is formed at the rear end of the guide slot 60 of the power plate 59 so that the guide pin 65 is brought into the recessed portion 68 by the action of the spring 67 when the power plate 59 advances forwardly.

The recording/reproducing head, pinch rollers and pressing mechanism therefor arranged under the base plate 22 is now explained.

On the bottom plate 1, a pair of capstan shafts 69a, 69b are provided so that the cassette positioning pins 2, 2 are interposed therebetween. A head 70 and a pair of pinch rollers 71a, 71b are also provided on said bottom plate 1 under the base plate 22. The head 70 is fixed to a head plate 73 of generally rectangular shape at a side thereof closer to the pack guide 4. The head plate 73 is adapted to advance or retreat in the transverse direction of the tape player along guide slots 74 formed on the bottom plate 1 so as to bring the head 70 into contact with a tape exposed portion of the cassette C. More specifically, a securing member 75 is provided on the head plate 73 and a head plate guide roller 76 is mounted on said securing member 75. The guide roller 76 has a shaft whose lower end is loosely engaged with the head plate 73 and whose upper portion is projected from the base plate 22 so as to abut against the edge of the aforesaid guide cutout 38 formed on the ejecting plate 27. The head plate guide roller 76 is normally urged towards the pack guide 4 by a spring 77 provided between the securing member 75 and the bottom plate 1. The roller 76 is adapted to move towards the pack guide 4 along the edge of the guide cutout 38 as the guide cutout 38 moves relative to the guide roller 76 according to the advance of the ejecting plate 27. Then, the head plate 73 is forced towards the pack guide 4 by the lower end of the shaft of the roller 76.

Figure 14:
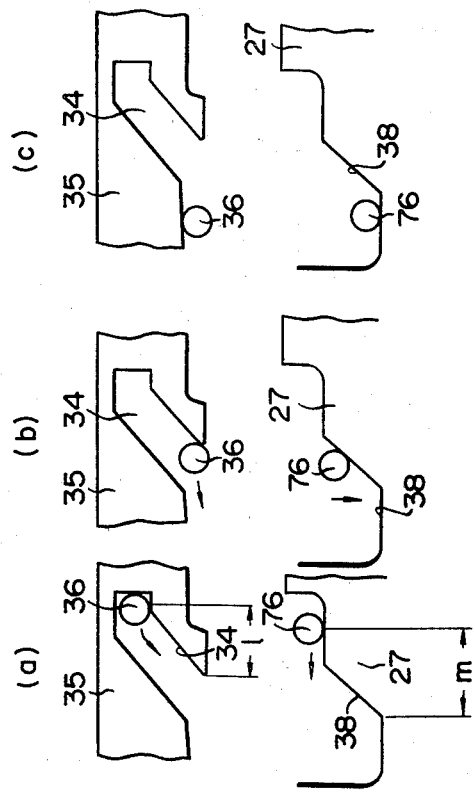
FIG. 14 is an explanatory view schematically showing a relationship between an inclined groove formed on an ejecting plate for lowering or lifting a pack guide and a cutout for guiding a head plate guide roller.

To carry out the forcing operation of the head plate 73 by the guide cutout 38 of the ejecting plate 27 and the vertical movement of the pack guide 4 by the inclined groove 34 formed on the ejecting plate 27 in accordance with a predetermined sequence, keeping a predetermined time difference between said operation and movement, the configurations of the guide cutout 38 and the inclined slot 34 are specified as follows (refer to FIG. 14). Assuming that the position of the guide roller 38 in the inclined groove 34 and the position of the head plate guide roller 76 in the guide cutout 38 in the cassette ejected state (in a position where the ejecting plate 27 is retired) are reference points, respectively, a distance 1 between the reference point in the inclined groove 34 and the lowermost end thereof is so selected as to be shorter than the distance in between the reference point in the guide cutout 38 and the innermost end thereof.

In the embodiment as disclosed and illustrated, the guide cutout 38 is formed generally in an L-shape so that the head plate guide roller 76 may move along the outer edge of the guide cutout 38 at an early stage of the advance of the ejecting plate 27, during which the guide roller 36 reaches the lower end of the inclined slot 34, and then the head plate guide roller 76 may move inwardly along the slope of the guide cutout 38. The configurations of the inclined groove 34 and the guide cutout 38, however, are not limited to the ones as illustrated. The guide cutout 38 may, for example, be formed in a linear slot having an inclination more gentle than the inclined groove 34. In the present embodiment, the lower end of the inclined groove 34 and the inner end of the guide cutout 38 is extended towards the rear portion of the ejecting plate 27 so that said ejecting plate 27 may advance after the guide roller 36 has reached the lower end of the inclined groove 34 and the head plate guide roller 76 reaches the inner end of the guide cutout 38.

Figure 13:
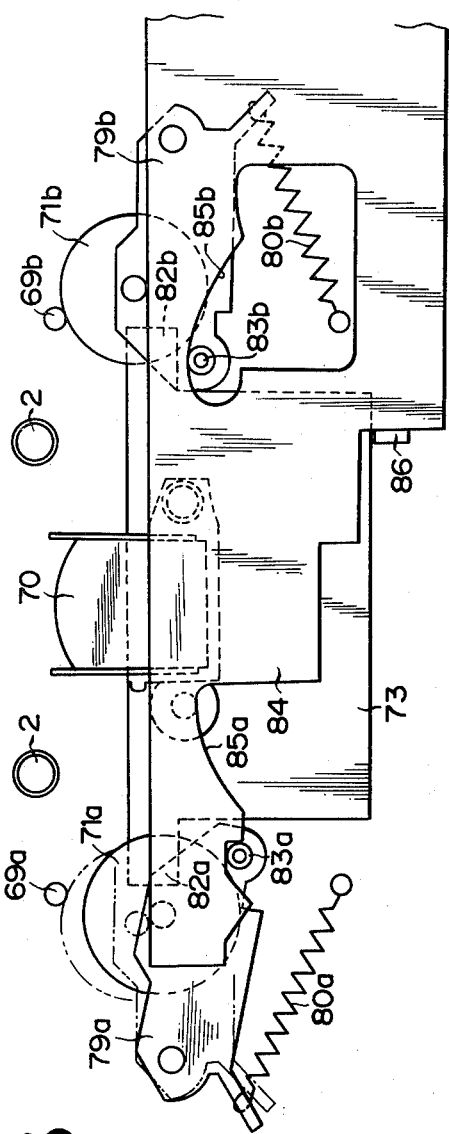
FIG. 13 is a plan view showing the interlocking relation between a change plate and a pinch roller.

On the other hand, pinch rollers 71a, 71b are provided at the forward and the rear end portion of the head plate 73, respectively, as shown in FIGS. 12 and 13. The pinch roller 71a located at the forward end of the head plate 73 (on the end nearer to the front of the player) is adapted to be pressed against the capstan shaft 69a during the reverse tape feed. The pinch roller 71b located at the rear end of the head plate 73 is adapted to be pressed against the capstan shaft 69b during the forward tape feed. More specifically, the pinch rollers 71a, 71b are rotatably mounted on support members 79a, 79b which are pivotally connected by shafts 78a, 78b erected on the bottom plate 1, respectively. Between the support members 79a, 79b and the bottom plate 1, are provided springs 80a, 80b, respectively, to urge the pinch rollers 71a, 71b towards the capstan shafts 69a, 69b, respectively. Guide roller fitting shafts 81a, 81b are provided at end portions of the pinch roller support members 79a, 79b, respectively. The fitting shafts 81a, 81b have lower ends engaged with outer edges (edge remote from the pack guide 4) of projected portions 82a, 82b formed at the forward and the rear end portion of the head plate 73, respectively. Said fitting shafts 81a, 81b have guide rollers 83a, 83b for the pinch rollers provided at their upper ends, respectively. The guide rollers 83a, 83b are fitted in the guide portions 85a, 85b, respectively, of a changeover plate 84 disposed slidably along the lower face of the base plate 22. The guide portions 85a, 85b are each so shaped that when the guide rollers 83a, 83b are positioned at their respective inner ends, the pinch rollers 71a, 71b may be pressed against the capstan shafts 69a, 69b, respectively, and according to the movement of the changeover plate 84, only one of the guide rollers may be positioned at the inner end of the guide portion and the other may be positioned at the outer end of the guide portion.

To make said changeover plate 84 be slidable in the backward and the forward direction, the rear end of the changeover plate 84 is connected to a plunger for changing over the tape feed direction. The changeover plate 84 has a projection formed integrally therewith which is adapted to abut against the lug 39 of the ejecting plate 27 projected from the lower face of the base plate 22, so that the changeover plate 84 can retreat according to the retreating of the ejecting plate 27.

The cassette loading control mechanism in accordance with this invention has a structure as specified referring to the embodiment disclosed and illustrated above, and operates for cassette loading and cassette ejection, respectively, as follows.

(Cassette loading)

As shown in FIG. 1, in a state before the cassette C is loaded, the pack guide 4 assumes its upper, raised position, and the cassette catch 14 attached to the pack guide 4 and the slide plate 20 engaged with the cassette catch 14 are located at their respective foremost, advanced positions. In this state, the cassette C is inserted into the pack guide 4 in the longitudinal direction in such a manner that the tape exposed face thereof may confront the head 70 under the base plate 22. Then, the tip end of the cassette C is inserted in the ]-shaped cassette catch 14 and tightly held between the upper plate of the cassette catch 14 and the inwardly bent holding portion 16 provided on the lower plate thereof. Under these conditions, if the cassette C is further pushed inwardly, the cassette catch 14 moves inwardly by the pushing force of the cassette C while being guided by the guide slot 15 of the pack guide 4. Then, the pressing projection 19 pushes against the rear wall of the guide groove 21 formed on the slide plate 20, so that the slide plate 20 is also retired towards the interior of the tape player according to the movement of the cassette catch 14. In this case, the slide plate 20 retreats to the cassette lowering position against the action of the ejecting spring 26 provided between the slide plate 20 and the base plate 22. At that time, the set spring 63 provided on the power plate 59 which is connected to the rear portion of the slide plate 20 through the rack-pinion mechanism acts against the retreat of the slide plate 20 in the first half course of the retreat, but acts for the retreat due to its compressed force in the remaining half course.

Figure 8:
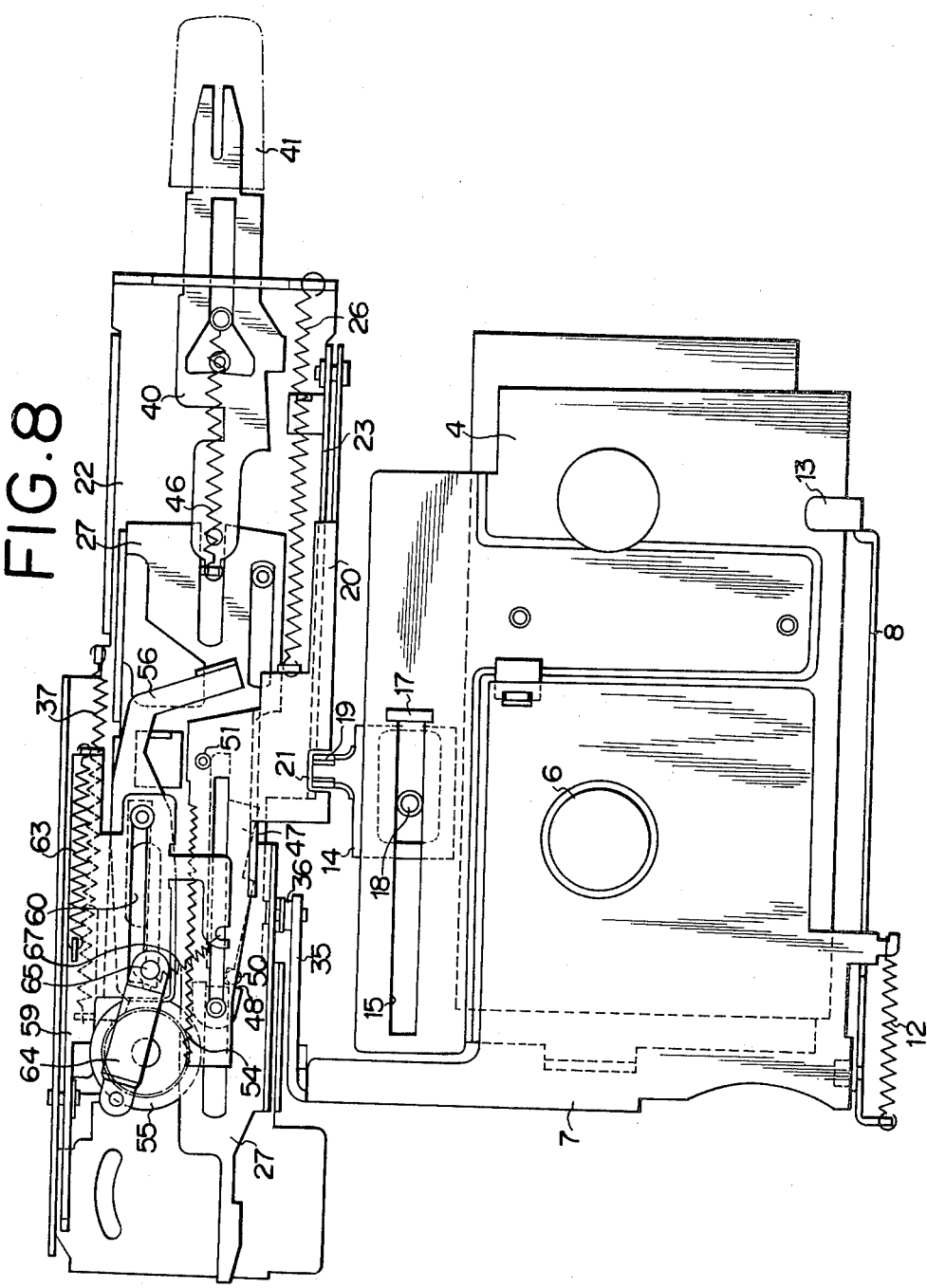
FIGS. 8 through 11 are plan views showing the operation sequence of the cassette loading control mechanism.
Figure 9:
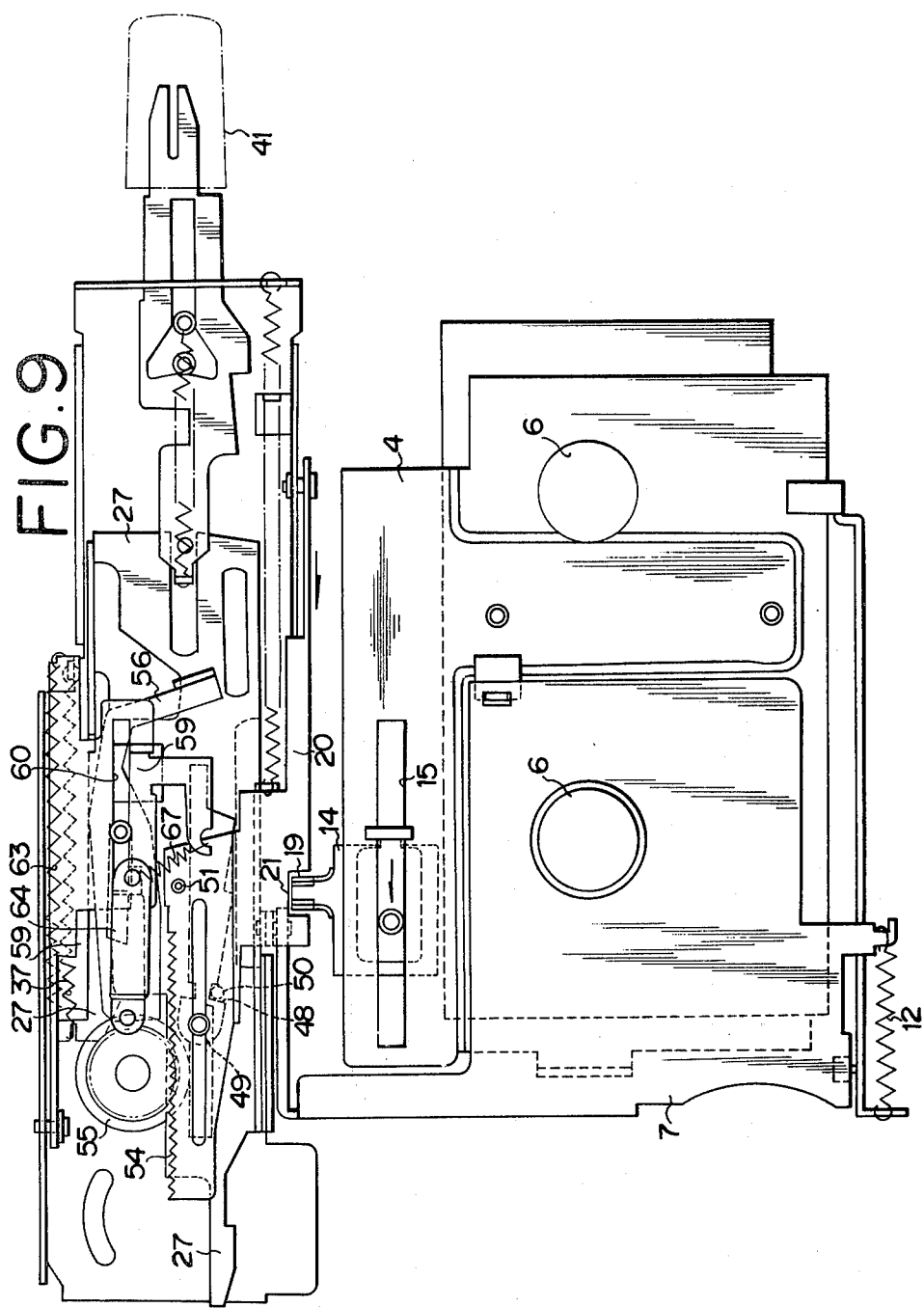
Figure 10:
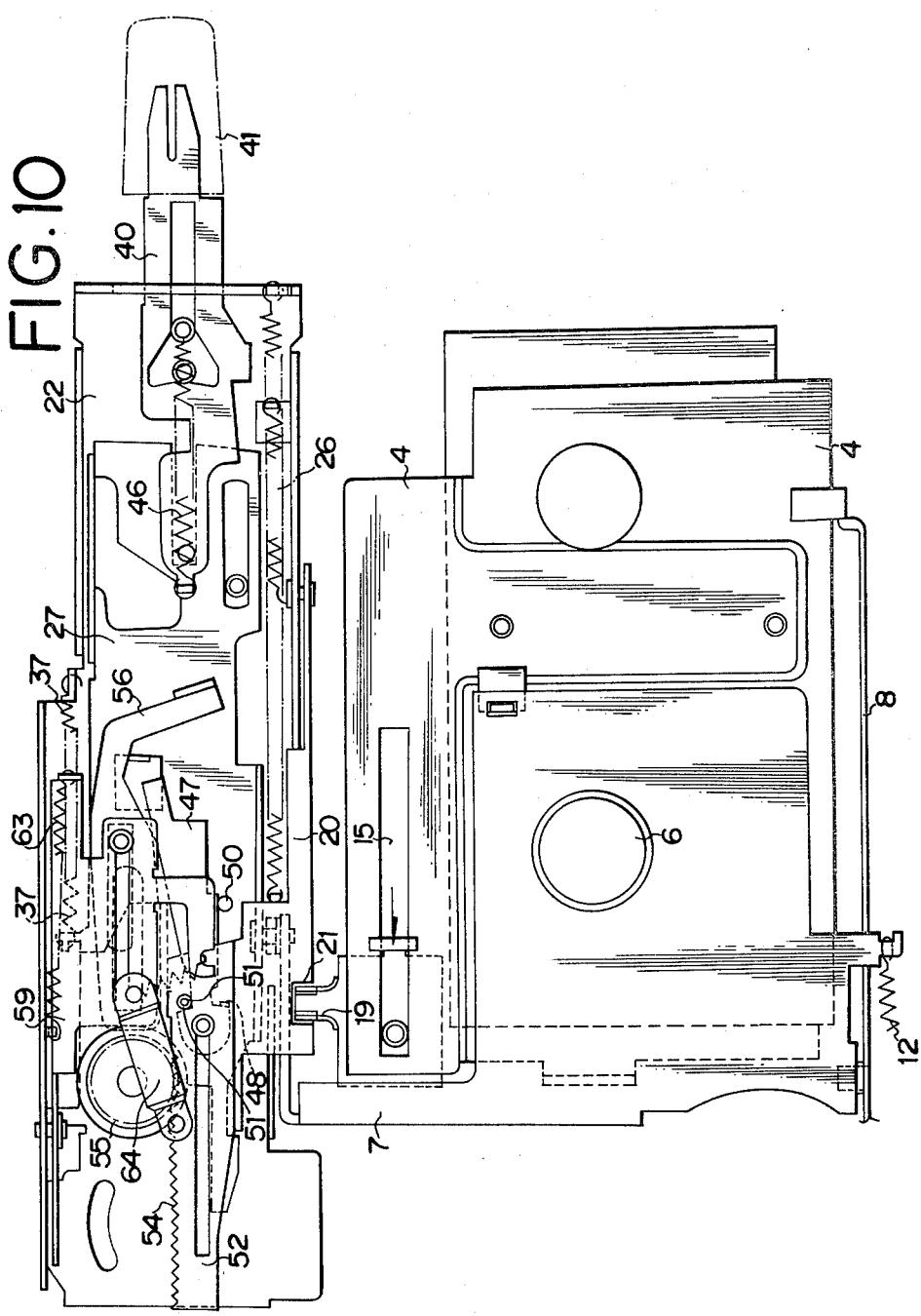
Figure 11:
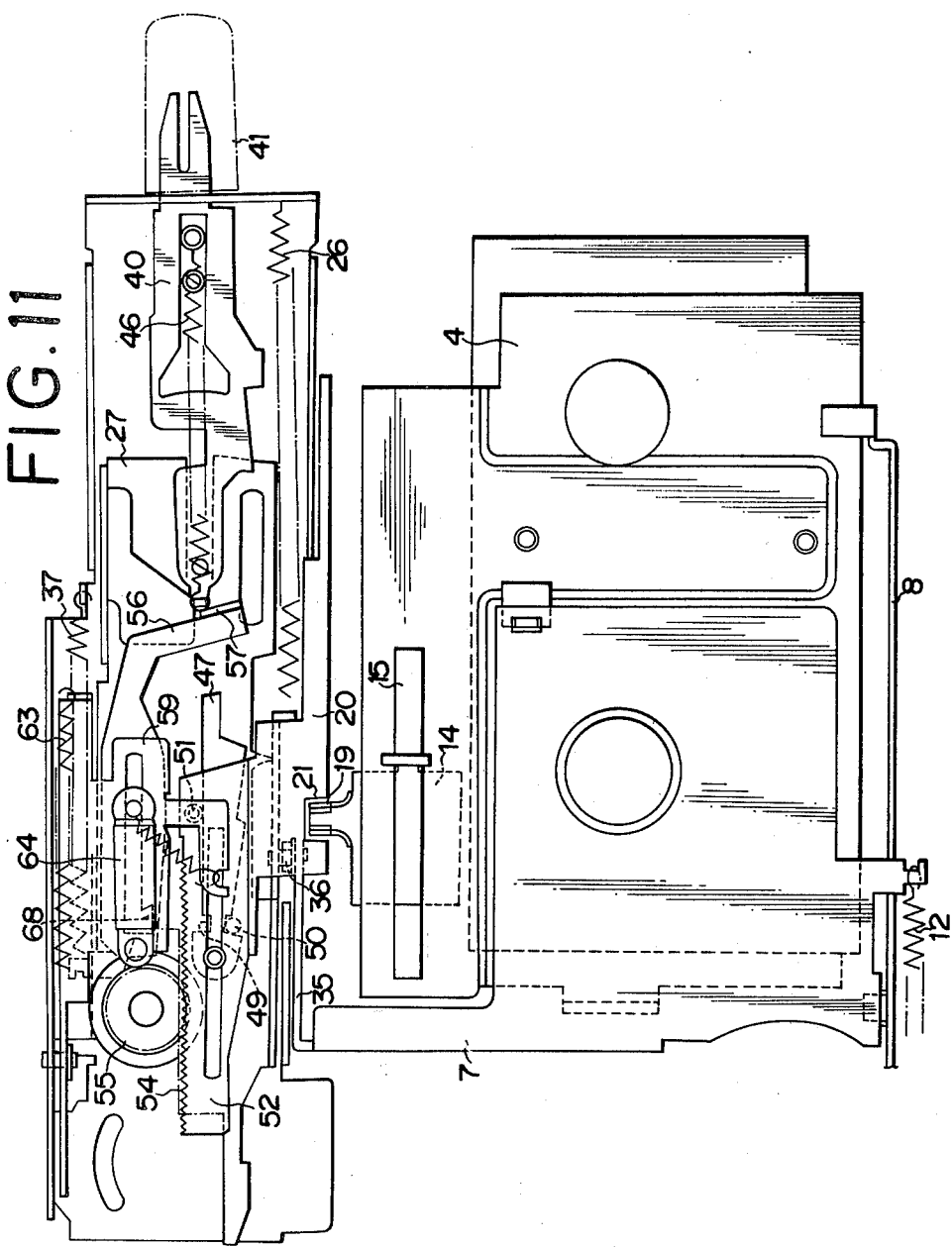

Stated illustratively, as shown in FIG. 8, the rack gear 54 is provided on the rear portion of the slide plate 20 through the gear plate 52 and the rack gear 54 is normally in mesh with the pinion 55 supported on the base plate 22. Thus, it will be seen that when the slide plate 20 is pushed to retreat by the cassette catch 14, the pinion 55 is then rotated clockwise and the pushing arm 64 pivotally connected to the pinion 55 moves forwardly. Since the guide pin 65 provided at a forward end of the pushing arm 64 is received within an engaging portion 68 of the guide slot 60 formed on the power plate 59, the power plate 59 is advanced by the pushing force of the pushing arm 64 against the action of the set spring 63. When the slide plate 20 reaches halfway of its retreat course and the pinion 55 is further rotated clockwise, the pushing arm 69 is fully stretched as depicted in FIG. 9. The pushing arm 64, which has been advanced according to the rotation of the pinion 55, then begins to retreat. As a result, the pressure applied to the power plate 59 by the pushing arm 64 is cancelled and the power plate 59 is forced to retreat by a force of the set spring 63 which has been compressed during the advance of the power plate 59. Accordingly, the pushing arm 64 is pushed in the retreat direction and the clockwise rotation of the pinion is further effected to draw the slide plate 20 into the interior of the tape player. Thus, when the slide plate 20 is forcibly retired by the action of the set spring 63, the forward wall of the guide groove 21 formed on said slide plate 20 is engaged with the pressing projection 19 of the cassette catch 14 to draw the cassette catch 14 with the cassette C held thereby, along the guide slot 15 into the interior of the pack guide 4 (refer to FIG. 10).

In general, when the slide plate 20 has been pushed and retired to about half of the course, the forward end of the cassette is drawn inside of an opening of an escutcheon of the tape player and it becomes difficult to push the cassette by any more hand. In this connection, it is to be noted that with the drawing mechanism of the present embodiment, the cassette C is automatically conveyed to the cassette lowering position by the compressed force of the set spring 63 stored in the course of the retreat of the cassette C upon manual depression thereof.

On the other hand, the lock plate 47 disposed under the gear plate 52 of the slide plate 20 acts, at a time of inserting the cassette C, to prevent the ejecting plate 27 from moving in the forward direction of the tape player by the action of the advancing spring 37 by engaging the ejecting plate lock pin 50 provided on the face of the ejecting plate 27 with the recessed portion 48 formed at the base portion of the lock plate 47 as shown in FIG. 8. In this connection, when the slide plate 20 is moved backwardly as mentioned above, the slide plate lock pin 51 provided on the lower face of the gear plate of the slide plate 20 is retired following the linear edge formed at the outer edge of the lock plate 47 as shown in FIG.

9 and acts to prevent the ejecting plate lock pin 50 from disengaging from the recessed portion 48 by counterclockwise rotation of the lock plate 47. However, when the slide plate 20 reaches the cassette lowering position, the slide plate lock pin 51 enters the recessed portion 49 on the outer edge of the lock plate 47 and the lock plate 47 is rotated counterclockwise by a corresponding angle. As a result, the ejecting plate lock pin 50 which has been engaged with the recessed portion 48 of the lock plate 47 is disengaged from the recessed portion 48 and the ejecting plate 27 moves forwardly by the action of the advancing spring 37 (Refer to FIG. 10).

When the ejecting plate 27 is thus caused to advance, the inclined groove 34 formed on the sidewall of the ejecting plate 27 is also caused to advance as shown in FIG. 4 and a tip end of a rotating lever 35 of the guide arm 7 is lowered while being guided by the upper edge of the inclined groove 34 to rotate the guide arm 7 downwardly around a rear pivotal point thereof. Then, the pack guide 4 coupled to the forward end of said guide arm 7 is pressed downwardly by the guide arm 7 and brought down to the bottom plate 1 while holding the cassette C therein. At this time, since the pressing projection 19 is adapted to move downwardly along the guide groove 21 of the slide plate 20 the cassette catch 14 provided on the pack guide 4 is brought down with the pack guide, holding the cassette C therein. Then, the positioning pins 2, 2 erected on the bottom plate 1 are fitted into the guide slots formed on the cassette C, respectively and guide the cassette C properly into the recording/reproducing position. In this case, since the cassette catch 14 holding the cassette C therein is movable relative to the pack guide 4 and the guide groove 21 of the slide plate 20 for regulating the backward and forward movement of the cassette catch 14 is provided with an enough allowance, the cassette catch 14 will never hinder such guiding of the cassette C by the positioning pins 2, 2.

After the cassette C has been set in its recording/reproducing position, if the ejecting plate 27 further advances, the head plate guide roller 76 is guided by the guide cutout 38 formed on the ejecting plate 27 to be displaced inwardly. Accordingly, the head plate 73 connected to the lower end of said roller 76 is moved towards the pack guide 4 to bring the head 70 into contact with the tape exposed portion of the cassette C. In this case, since the guide cutout 38 for controlling the movement of the head plate guide roller 76 has such a configuration that after the guide roller 36 for moving the pack guide 4 in the vertical direction reaches the lower end of the inclined groove 34, the head plate guide roller 76 reaches the inner end of the cutout 38 as shown in FIG. 14, there is no possibility that the head 70 is advanced towards the pack guide 4 to hinder the lowering of the cassette C before the cassette C is set in its recording/reproducing position.

As the head plate 73 moves, the pinch rollers 71a, 71b which have been held by the projected portions 82a, 82b of the head plate 73 are released to move towards the capstan shafts 69a, 69b, respectively, by the action of the respective springs 80a, 80b. However, each pinch roller 71a or 71b is restrained at its guide roller 83a or 83b which is repressed by the guide portion 85a or 85b of the changeover plate 84, so that only one of the pinch rollers is allowed to be brought into contact with the pastan shaft. Stated illustratively, at a time of cassette ejection, the ejecting plate 27 is in its retreated position and the changeover plate 84 is also in its retreated position because it is pushed by the log 39 of the ejecting plate 27. Accordingly, if the cassette is inserted in this state, the guide roller 83b enters the inner end of the guide portion 85a formed at the rear of the changeover plate 84, and only the pinch roller 71b is pressed against the capstan shaft 69a to transport the tape forwardly.

When it is required to transport the tape reversely, the plunger connected to the changeover plate 84 is energized to advance the changeover plate 84 which in turn moves the guide portions 85a, 85b to displace outwardly the guide roller 83b of the forward pinch roller and to move the guide roller 83a of the reverse pinch roller to the inner end of the guide portion 85a, bringing the reverse pinch roller 71a into contact with the capstan shaft 69a.

(Cassette ejecting)

To remove the cassette C set in the recording/reproducing position on the bottom plate 1, the push button 41 is depressed to make the push lever 40 retreat into the interior of the tape player. Then, the ejecting plate 27 is pushed by the guide pin 42 provided at the rear end of the push lever 40 and starts to retreat against the action of the advancing spring 37 since the ejecting plate 27 is at its advanced foremost position when the cassette C is loaded.

According to the retreat of the ejecting plate 27, first the head plate guide roller 76 is displaced outwardly by the action of the guide cutout 38 formed on the ejecting plate 27 and then the head plate 73 connected to the guide roller 76 is also displaced to release the engagement of the head with the cassette C. According to the displacement of the head plate 73, in turn, the pinch rollers 71a, 71b are moved outwardly by the projected portions 82a, 82b of the head plate 73 and disengaged from the respective capstan shafts 69a, 69b. The displacement of the head plate 73 is further followed by retreat of the inclined groove 34 formed on the sidewall of the ejecting plate 27. Then, the guide roller 36 which has been engaged in the inclined groove 34 is pushed up by the lower edge of the groove 34 to rotate the guide arm 7 upwardly. Upon the upward rotation of the guide arm 7, the pack guide 4 connected to the forward end of the arm 7 is raised vertically from the bottom plate 1 while being guided by the guide pin 10 and the guide slot 11. At this time, of course, the cassette catch 14 provided on the pack guide 4 is raised along the guide groove 21 of the slide plate 20 holding the tip end portion of the cassette C therein.

On the other hand, as the ejecting plate 27 is retired, the ejecting plate lock pin 50 projected from the face thereof retreats along the edge of the lock plate 47 which is closer to the pack guide 4 and enters the recessed portion 48 formed on the lock plate 47 when the lifting of the pack guide 4 is completed, pushing the rear edge of the recessed portion 48 to rotate the lock plate 47 clockwise. Upon the clockwise rotation of the lock plate 47, the slide plate lock pin 51 which has been engaged with the recessed portion 49 on the opposite side of the lock plate 47 is disengaged therefrom. Then, the slide plate 20 starts to advance in the forward direction of the tape player by the action of the ejecting spring 26.

At this time, since the rack gear 54 formed integrally with the slide plate 20 at its rear portion is in mesh with the pinion 55 and the pushing arm 64 of the pinion 55 is received in the engaging portion 68 formed in the guide slot 60 of the power plate 59, the slide plate 20 is prevented from advancing by the set spring 63 provided on the power plate 59 (because the set spring 63 is designed to have a force larger than that of the ejecting spring 26). Then, in accordance with the present invention, the kick plate 56 is adapted to be pushed at its projection formed at the forward end thereof by the rear end of the push lever 40 to be rotated clockwise. Then, the rear end of said kick plate 56 is turned outwardly (towards the opposite side to the pack guide 4) to displace outwardly the guide pin 65 of the pushing arm 64 fitted in the guide slot 58 to disengage said guide pin 65 from the engaging portion 68 of the power plate 59. Consequently, the pushing arm 64 is allowed to move along the guide slot 60 of the power plate 59 and the action of the set spring 63 which has prevented the rotation of the pinion 55 is released to permit forward advancing of the slide plate 20.

Following the advance of the slide plate 20, the rear edge of the guide groove 21 formed on the slide plate 20 pushes the cassette catch 14 forwardly and the cassette catch 14 is forced forwardly while being guided by the guide slot 15. At this time, the cassette C advances within the pack guide 4 while being caught at its rear portion by the cassette catch 14, until the forward end of the cassette C is projected from the forward end of the pack guide 4 to complete the ejecting operation. Though this ejecting operation of the cassette C is carried out instantaneously and quickly by the action of the ejecting spring 26, the cassette C will never disengage and spring out from the cassette catch 14 since the cassette C is firmly held at its rear portion by the cassette catch 14.

Simultaneously with the ejection of the cassette C by the advance of the slide plate 20, the gear plate 52 provided at the rear portion of the slide plate 20 rotates the pinion 55 counterclockwise and makes the pushing arm 64 connected to said pinion 55 reciprocate within the guide slot 60 of the power plate 59. Eventually, the guide pin 65 provided at the tip end of the pushing arm 64 enters the engaging portion 68 of the power plate 59 to throw the pushing arm 64 into a standby position for pushing the power plate 59 in next cassette loading. Concurrently, the slide plate lock pin 51 provided on the gear plate 52 of the slide plate 20 is moved forwardly along the outer edge of the lock plate 47 for keeping the lock plate 47 from rotating outwardly. Therefore, it can be well prevented that the ejecting plate lock pin 50 which has been engaged with the recessed portion 48 of the lock plate 47 is disengaged from the recessed portion 48 and the ejecting plate 27 advances inadvertently or unexpectedly by the action of the advancing spring 37.

When the cassette is loaded, if the direction of the tape transport is reversed and the changeover plate 84 is in the advanced state, the changeover plate 84 is pushed backwardly by the lug 39 of the ejecting plate 27 according to the retreat of the ejecting plate 27 to change over the changeover plate 84 and the pinch roller associated therewith into a forward feed mode. Then, it is assured that recording/reproducing is carried out in the forward mode whenever a cassette is put into the tape player.

The cassette loading control device in accordance with the present embodiment as mentioned above has effects as summarized in the following.

(A) In the present embodiment, drawing and ejecting of the cassette are carried out through the engagement of the pinion disengageably connected to the power plate through the pushing arm with the rack gear of the slide plate, and the slide plate is interlocked through the lock plate with the ejecting plate for moving the cassette up and down. Thus, the embodiment can control, with accuracy, a series of cassette loading operations such as drawing, setting into the recording/reproducing position and ejection of the cassette, with reduced number of simplified components. Furthermore, since each component is made of a plate-form material and disposed in a plane parallel to the plane of the bottom plate, the ultimate tape player can be reduced in overall height and size and simplified in structure and yet having an automatic cassette drawing mechanism.

(B) In the present invention, so long as either one of the slide plate and the ejecting plate has not completed its movement, the other will never be moved backwardly or forwardly, so that the operations such as cassette drawing, lowering the cassette into and lifting the same from the recording/reproducing position and cassette ejection are carried out precisely in regular sequence. In particular, since the operation of the lock plate for locking the slide plate which has completed the drawing of the cassette is utilized directly to release the locking of the ejecting plate for allowing the cassette to be lowered. On the contrary, when the ejecting plate which has completed the lifting of the cassette is locked by the lock plate, the locking of the slide plate is released by the operation of the lock plate to effect the ejection of the cassette C. Then, the cassette drawing, lowering, lifting and ejecting are successively carried out without intermission, to enable rapid and smooth cassette loading.

(C) In the present embodiment, the force of the ejecting spring which is provided on the slide plate is smaller than that of the set spring provided on the power plate, and the engagement between the slide plate and the power plate is released when the cassette is ejected. Accordingly, in the cassette drawing operation, the slide plate retreats by the action of said setting spring against the action of the ejecting spring storing an energy for ejection, while in the cassette ejecting operation, the engagement between the power plate and the pinion is released and only the slide plate is caused to advance by the action of the ejecting spring to push out the cassette. Thus, the removal of the cassette after the use of the tape player is much facilitated.

(D) In case head and pinch roller pressing mechanism is interlocked with the ejecting plate which controls the up and down movement of the cassette, pressing or disengagement of the head etc. relative to the tape can be controlled concurrently with the control of the loading or unloading of the cassette. In particular, where the mechanism is so adapted that the lowering or lifting of the cassette into or from the recording/reproducing position and advancing or retreating of the head etc. are carried out in sequence keeping predetermined time intervals according to the backward or forward movement of the ejecting plate, the head or pinch rollers will not hinder the loading or unloading of the cassette.

The arrangement of this invention is not limited to the one as disclosed and shown herein. For example, although the arrangement as illustrated has such a structure that the kick plate is disposed under the power plate as means for releasing the engagement between the pushing arm of the pinion and the power plate, and the kick plate is adapted to be pushed by the push lever, the rear end of the push lever may be extended into the vicinity of the pushing arm so as to directly disengage the pushing arm from the power plate without using a kick plate. Further, although the head and the pinch roller are disposed under the drawing mechanism and the base plate is disposed above the bottom plate keeping a space therefrom in the arrangement as shown, if the head etc. are provided on the opposite side of the drawing mechanism or in the interior of the tape player, the base plate may be a part of the bottom plate. In this case, the head plate guide roller controllable by the ejecting plate and the head plate are interconnected by suitable link means. The cassette catch provided on the slide plate may be formed in other manners than that shown in the figures. More specifically, it may be so formed that it engages with a reel shaft inserting hole of the cassette during the horizontal movement of the cassette for effecting the drawing and ejecting of the cassette but disengages from the cassette in the lowering or lifting operation of the cassette to allow the cassette to move independently of said cassette catch.

A preferred form of the tape player in accordance with the present invention has an improved fast-forward/rewind mechanism as will be described hereafter.

Figure 15:
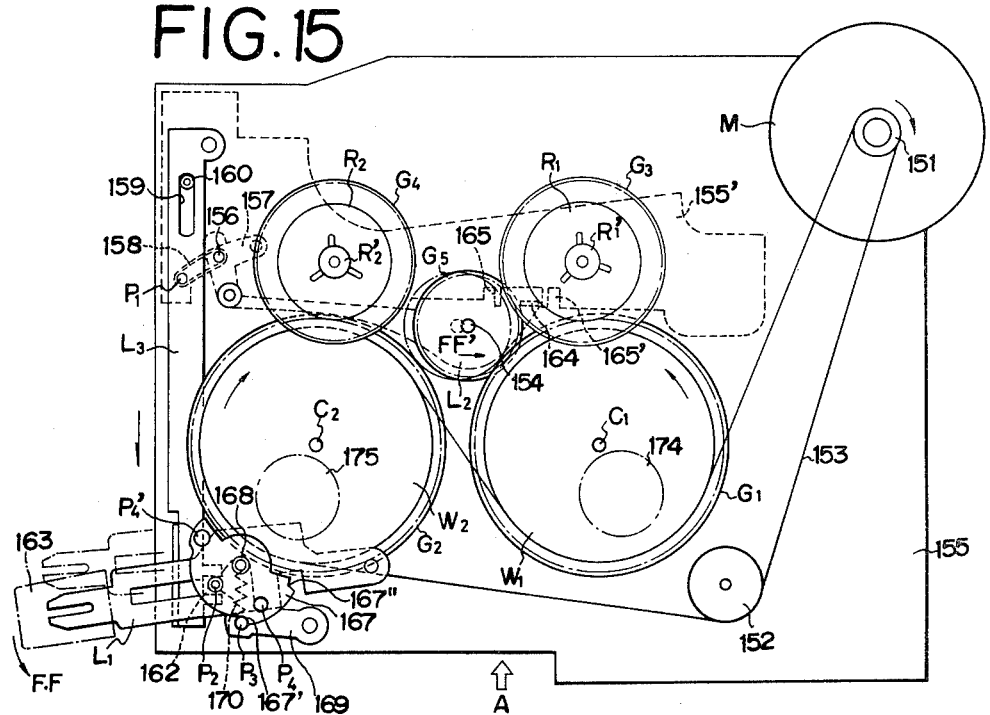
FIG. 15 is a plan view of a fast-forward/rewind drive mechanism suitable for a tape player of the present invention, illustrating the mechanism in the fast-forward mode.

FIG. 15 shows the tape player set in a fast-forward mode by throwing an ejecting plate which acts also as a fast-foward/rewind changeover lever into a fast-forward FF position. In the figure, $C_1$ and $C_2$ designate a right and a left capstan, respectively, which are provided with thin geared flywheels $W_1$, $W_2$, respectively. Characters $G_1$ and $G_2$ are gear portions of the geared flywheels $W_1$, $W_2$, respectively.

An endless driving belt 153 is provided between the geared flywheels $W_1$, $W_2$, and a pulley 151 of a motor M through a suitable guide pulley 152 so as to rotate the geared flywheels $W_1$, $W_2$ and accordingly the capstans $C_1$, $C_2$ in opposite directions. Characters $R_1$ and $R_2$ designate a pair of reel turntables. The reel turntable $R_1$ is associated with the capstan $C_1$ and the reel turntable $R_2$ is associated with the capstan $C_2$.

When the tape player is arranged into an automatic reversible one, the reel turntable $R_1$ is now used as a takeup reel in forward feed of a tape (not shown) and the reel turntable $R_2$ is used as a takeup reel in reverse feed of the tape. $R_1'$, $R_2'$ are reel shafts and $G_3$, $G_4$ are gears formed integrally with the reel turntables $R_1$, $R_2$, respectively, for rotating the respective reel turntables. Each reel turntable $R_1$ or $R_2$ is formed very thin even though the gear $G_3$ or $G_4$ is provided.

Figure 16:
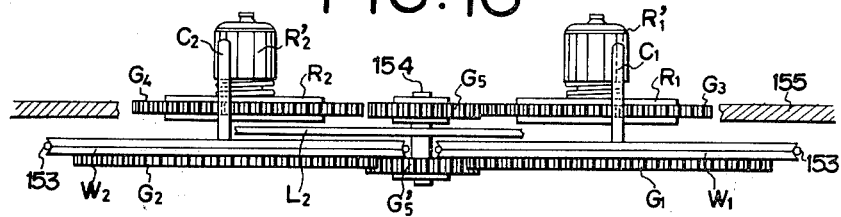
FIG. 16 is an enlarged side elevational view showing the positional relationship between geared flywheels, reel turntable rotating gears, fast-forward/rewind changeover gears, etc. as viewed from A.

The geared flywheels $W_1$, $W_2$ and the gears $G_3$, $G_4$ are partly superposed each other as shown in FIG. 16 and arranged at different heights. For example, the turntables $R_1$, $R_2$ are disposed at an upper position and the flywheels $W_1$, $W_2$ are disposed at a lower position. Fast-forward/rewind changeover gears $G_5$, $G_5'$ are rotatably and coaxially supported by a shaft 154 so as to be associated with the geared flywheels $W_1$, $W_2$ and the reel turntable rotating gears $G_3$, $G_4$, respectively. The shaft 154 is mounted on a changeover gear plate $L_2$.

Where the geared flywheels $W_1$, $W_2$ and the gears $G_3$, $G_4$ are all disposed in the same plane, two gears $G_5$, $G_5'$ are not necessary and one changeover gear $G_5$ will suffice.

The changeover gear plate $L_2$ is slidably mounted on a bottom plate 155 of a tape player body through appropriate means. An end portion of the changeover gear plate $L_2$ is connected to an operating end of a bell-crank lever 157 which is pivotally mounted on the bottom plate 155. Another end of the bell crank lever 157 is provided with a U-shaped wire spring 158 which is in turn connected to a slide plate $L_3$ slidably disposed on the tape player body through an engaging pin $P_1$ projected on the slide plate $L_3$.

Numeral 159 designates a guide slot formed on the slide plate $L_3$ and numeral 160 designates a guide pin provided on the bottom plate 155.

The slide plate $L_3$ has an engaging recess 162 defined by two projections formed at its one end portion, and is interlocked with the ejecting plate $L_1$ acting as fast-forward/rewind changeover lever through an engaging pin received in the recess 162. Numeral 163 indicates a manual knob.

In the so formed tape player, when the ejecting plate $L_1$ is set in a position as shown by a phantom line (in case of reproducing), the fast-forward/rewind changeover gear $G_4$ is put in a position as shown also by a phantom line. On the other hand, when the ejecting plate $L_1$ is thrown into left or right position, the fast-forward/rewind changeover gear $G_5$ is moved left or right as viewed in the figures so as to be interposed between and meshed with the gear $G_1$ of the flywheel $W_1$ and the reel turntable rotating gear $G_3$, or with the gear $G_2$ of the flywheel $W_2$ and the gear $G_4$. The changeover gear plate $L_2$ is formed with a stroke regulating member 164. Stroke regulating projections 165, 165' are formed on a plate 155' fixed to the bottom plate 155. The stroke regulating member 164 is disposed between the two stroke regulating projections 165, 165' for regulating a lateral movement of the fast-forward/rewind changeover gear $G_5$.

Numeral 167 designates a fast-forward/rewind changeover plate pivotally supported by a shaft 168 on the bottom plate 155 and fixed to an engaging pin $P_2$ so as to be pivoted according to the pivotal movement of the ejecting plate $L_1$. Numerals 167' and 167" are fast-forward lock pin engaging portion and rewind lock pin engaging portion formed on the fast-forward/rewind changeover plate 167, respectively. Numeral 169 is a lock link pivotally supported on the bottom plate 155 and $P_3$ a lock pin fixed to the lock link 169. Between the lock pin $P_3$ and the shaft 168 is provided a spring 170 to urge the lock link 169 so as to keep the locking state.

Figure 17:
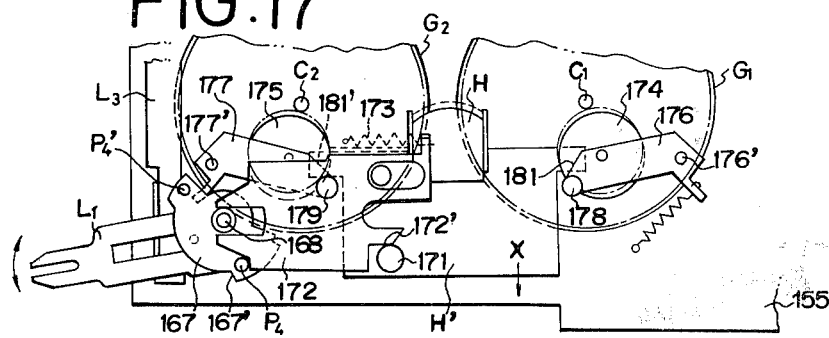
FIG. 17 is a part of the fast-forward/rewind drive mechanism illustrated in FIG. 15, further showing a head switching plate etc.

FIG. 17 shows a head H and head position switching means comprising a head switching plate 172 etc. The head switching plate 172 is slidably provided on the tape player body and normally urged so as to return to its original position by a spring 173 provided between the head switching plate 172 and the player body. The head switching plate 172 is further adapted to be engaged with either one of engaging pins $P_4$, $P_4'$ provided at opposite end portions of the fast-forward/rewind changeover plate 167, when the ejecting plate $L_1$ is pivoted, to be pushed back into the interior of the tape player body.

A head plate H' on which the head H' is fixedly mounted is slidable in the vertical direction. 171 is a roll for head releasing and 172' a porition for head releasing formed on the head switching plate 172. Thus, it will be seen that when the head switching plate 172 is pushed inwardly, the head releasing roll 171 enters the head releasing portion 172'.

Numerals 174, 175 designate pinch rollers and 176, 177 pinch roller holders supported on the bottom plate 155 by shafts 176', 177', respectively. Numerals 178, 179 are rolls provided on the pinch roller holders 176, 177, respectively. These rolls 178, 179 are adapted to abut against projections 181, 181' formed on opposite ends of the head plate H' and keep the pinch rollers 174, 175 spaced by a given distance from capstans $C_1$, $C_2$, respectively when the head plate H' is retired in the direction of an arrow X.

The so arranged fast-forward/rewind drive mechanism in the cassette-type tape player in accordance with the present invention will operate as follows:

It is now assumed that the tape player has been set in a forward tape feed mode or a reverse tape feed mode for effecting tape recording/reproducing before the fast-forward/rewind drive mechanism is operated. If the player is set in a forward tape feed mode, the reel turntable $R_1$ acts as a take-up reel and the pinch roller 174 is pressed against the capstan $C_1$. In case the tape player is in a reverse feed mode, the reel turntable $R_2$ acts as a takeup reel and the pinch roller 195 is pressed against the capstan $C_2$. In either case, the ejecting plate $L_1$ and the fast-forward/rewind changeover gears are in their respective positions as shown by phantom lines. Also in either case, when the ejecting plate $L_1$ is first pivotally operated to fast-forward mode FF, the changeover gear plate $L_2$ slides in the direction of an arrow FF' through the slide plate $L_3$ and the bell-crank lever 157, and the fast-forward/rewind changeover gears $G_5$, $G_5'$ are brought into mesh with the gear $G_1$ of the geared flywheel $W_1$ and the gear $G_3$ to drive the reel turntable $R_1$ in the fast-forward mode. This meshing relation is positively maintained by the action of the wire spring 158 provided on the bell-crank lever 157. At this time, a forward tape feed mechanism (not shown) is released from the reel turntable $R_1$. The fast-forward mode is established by engaging the lock pin $P_3$ with the fast-forward lock pin engaging portion 167' formed on the fast-forward/rewind changeover plate 167 and each component assumes its position as shown in FIG. 15.

Simultaneously with the operation as mentioned above, as shown in FIG. 17, the head H and the pinch roller 174 or 175 is caused to retreat from the reproducing position (position as shown by a phantom line) to be spaced therefrom.

Figure 18:
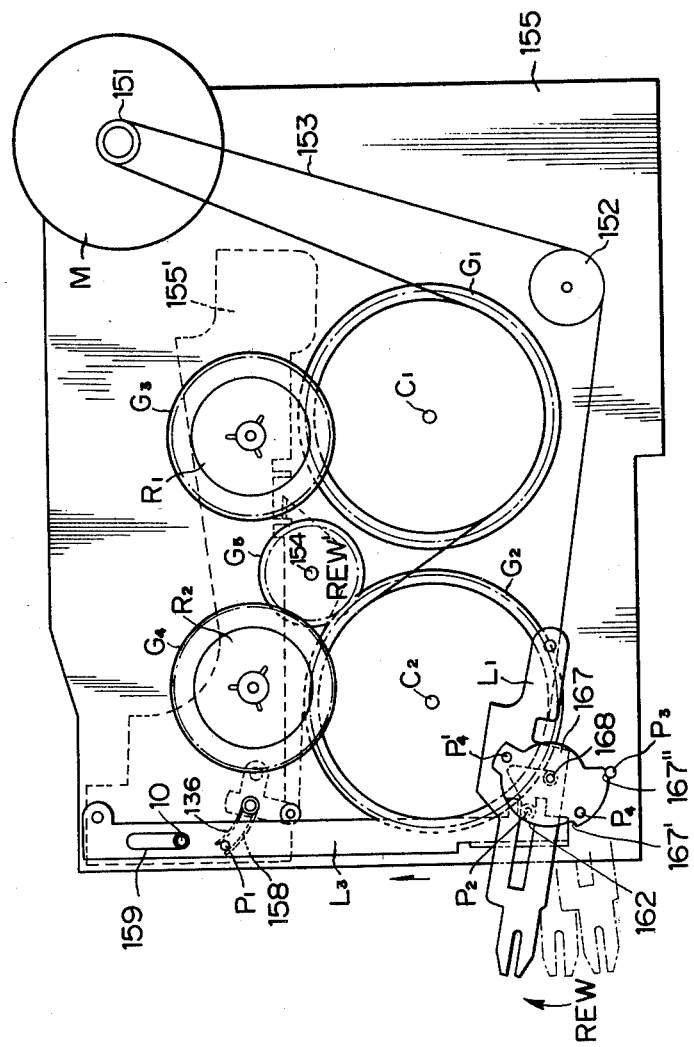
FIG. 18 is a plan view similar to FIG. 15 but showing the mechanism in the rewind mode.

On the other hand, when the ejecting plate $L_1$ is thrown into the rewind REW position as shown in FIG. 18, the slide plate $L_3$ and the changeover gear plate $L_2$ are displaced in the opposite direction to the case as shown in FIG. 15, and the fast-forward/rewind changeover gears $G_5$, $G_5'$ are brought into mesh with the gear $G_2$ of the geared flywheel $W_2$ and the gear $G_4$ to drive the reel turntable $R_2$ in the rewind mode. At this time, the wire spring 158 acts also to ensure the aforesaid meshing relation.

The rewind mode is locked by engaging the lock pin $P_3$ with the rewind lock pin engaging portion 167" formed on the fast-forward/rewind changeover plate 167 and each component is thrown in a position as shown in FIG. 18.

Concurrently with the operation as mentioned above, the engaging pin $P_4'$ on the changeover plate 167 is brought into engagement with the head switching plate 172 to push it inwardly. Then, the head H and the pinch roller 174 or 175 is caused to retreat from the reproducing position in the same manner as in the fast-forward mode.

In general, a cassette-type tape player has a tape transport direction reversing mechanism which generally includes a plurality of idler members and a drive mechanism associated therewith and is inevitably rendered bulky. Of course, as to the mechanism, it is also desired to reduce the size and the thickness thereof and yet to provide accurate operation.

In the past, to reverse the direction of the tape transport, a rubber idler roller is used and it is interposed between a forward reel and a reverse reel provided in the tape player so as to be switched therebetween, and a driving force from the idler roller is transmitted to either one of the reels to make the selected one act as a takeup reel for feeding the tape towards said reel.

However, where the rubber idler roller is employed, the contact area between the idler roller and the reel to be driven thereby should be large enough to transmit the driving force accurately because the transmission of the driving force is effected by a frictional engagement between the idler roller and the reel. Accordingly, it will be appreciated that an atempt to reduce the thickness of the idler roller has reached a limit, because the reduction in thickness prevents accurate transmission of the rotation of the idler roller to the reel required for obtaining an excellent reproduced sound. Thus, the idler has been a bar to reduction in size and thickness of the tape player.

To solve this problem, there has been proposed employment of an idler gear rather than employment of the rubber idler roller to attain desired reduction in size and thickness of the tape player, yet keeping an accuracy of the transmission. In effect, a switching mechanism with an idler gear is employed where a switching operation is carried out manually, e.g., in a fast-forward/rewind changeover mechanism. However, the switching mechanism using an idler gear involves such a defect that the addenda of the gears are possibly locked each other in the switching operation, preventing an accurate mesh of the gears. Therefore, though such an idler gear may be used at a position where a relatively large force can be applied manually and repeatedly as in the fast-forward mechanism, it is not suitable for such a switching as is carried out by a relatively small force given, for example, by a pulling force of a plunger or a torque of a motor, as in a tape transport reversing operation during a recording/reproducing operation of the automatic reversible tape player. Where an idler gear is desired it is preferred, in general, to use an involute gear which can provide a smooth rotation of reels and yet minimize a noise generation. This type of gear, however, is liable to be subject to locking during the switching due to its planar addendum. In addition, once the lock is caused, the release thereof is very difficult, so that it cannot be practically used for the tape transport reversing operation in the automatic reversible tape player.

In view of these facts, it has been considered that the switching mechanism using idler gears is not applicable to the tape transport reversing mechanism of the automatic reversible tape player. In the tape player of this type, therefore, the rubber idler has been employed in spite of its defect that it prevents miniaturization and decrease in thickness of the tape player.

In this connection, this invention has been achieved based on a finding that the lock of the gears will occur only when the gears in stationary states are brought into mesh with each other, and that the lock will not occur when one of the gears is in a rotating state, because the addendum of the gears are displaced each other immediately after they are brought into engagement with each other when one of the gears are being rotated. Based on the finding of this phenomenon, this invention provides a novel idler gear switching mechanism which is capable of attaining a normal mesh of gears either when the idler is switched to gears for the forward reel or when it is switched to gears for the reverse reel. Thus, in the tape player of the present invention, the entire size and thickness of the tape player is much reduced yet maintaining an accurate operation, by using the idler gear in the switching mechanism.

FIGS. 19 to 22 show an idler gear switching mechanism portion of a tape player. In the figures, numerals 201a, 201b are a pair of reels rotatably provided on the tape player, and the right reel 201a is used as a forward reel and the left reel 201b is used as a reverse reel. Stated illustratively, during the forward tape transport, the forward reel 201a is driven in the direction of an arrow shown in FIG. 19 to act as a takeup reel. On the other hand, during the reverse tape transport, the reverse reel 201b is driven to act as a takeup reel. Reel rotating gears 202a, 202b are formed integrally with the reels 201a, 201b, respectively. The gears 202a 202b are adapted to be in mesh with an idler gear as will be mentioned later to rotate the reels 201a, 201b in opposite directions.

In the vicinity of the reverse reel 201b, a pulley 203 is fixedly provided, and at an end portion of the tape player body, a motor 204 is provided. An endless belt 206 is provided between an output shaft 205 of the motor 204 and the pulley 203 to rotate the pulley 203 normally in one direction (in the direction of an arrow) by the motor. A transmission gear 207 and a reverse drive gear 208 are formed integrally with the pulley 203 on its upper face. The transmission gear 207 is adapted to be in mesh with a follower gear 209 provided adjacently to the transmission gear 207. The follower gear 209 has a forward drive gear 210 formed integrally therewith and adapted to be normally rotated in the direction opposite to the reverse drive gear 208.

For rotating the forward drive gear 210 and the reverse drive gear 208 in opposite directions, they may be interlocked each other using the transmission gear 207 and the follower gear 209 as illustrated, or they may be driven by motors independently of each other, or may be driven by a motor if pulleys are provided on the gears, respectively, and a belt is mounted between the pulleys and the motor so as to form an S-shape.

An idler gear 211 is disposed so as to reciprocate between the forward drive gear 210 and reel rotating gear 202a, and the reverse drive gear 208 and reel rotating gear 202b. In particular, according to the present invention, the locus of the movement of the idler gear 211 is formed in such a manner that either when the idler gear 211 is brought into the forward side or when it is brought into the reverse side, the idler gear 211 first meshes with the drive gear 210 or 208 and then meshes with the reel rotating gear 202a or 202b.

This will be explained in detail referring to FIG. 21(A). The reel rotating gears 202a, 202b have rotation centers 202a', 202b', respectively. Similarly, the drive gears 210, 208 have rotation centers 210', 208', respectively. A rotation center of the idler gear 211 is denoted by P'. Assuming that l and l' are the lines each connecting a point $P_1$ which is a rotation center P' of the idler gear when the intermeshing pich circles of the above-mentioned three gears are brought into contact with each other and a point $P_2$ which is a rotation center P' of the idler gear when the addendum circles are brought into contact with each other, the idler gear 211 is adapted to move towards the intermeshing point, forming a locus which passes points away from the line 1 or 1' towards the drive gear. More specifically, where the idler gear 211 approaches along the line or ' to the intermeshing point with the drive gear and the reel rotating gear, the idler gear 211 is specifically adapted so that it may approach the intermeshing point with the gears by a course away from the line l or l' towards the drive gear. Then, the idler gear 211 will first mesh with the drive gear and then mesh with the reel rotating gear in sequence. In this case, when the idler gear 211 comes into mesh with the drive gear 210 or 208, it cannot approach the drive gear any more. Accordingly, in effect, the idler gear 211 approaches the intermeshing point, where it is in mesh with the two gears, taking a course within a range defined by the lines l, l' and circles m, m' around the rotation centers 210', 208' of the drive gears 210, 208, respectively, and having radii corresponding to the distance between the rotation centers of the drive gear and the idler gear when their intermeshing pich circles are in contact with each other.

Figure 21A:
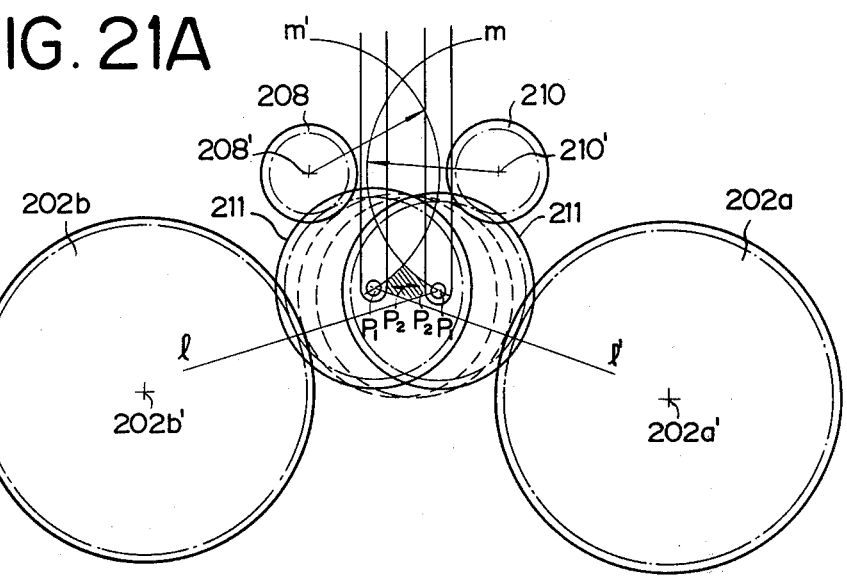
FIGS. 21(A) and (B) are plan views showing the relationship between various gears of the mechanism shown in FIGS. 19 and 20 and locus of an idler gear of said mechanism.
Figure 21B:
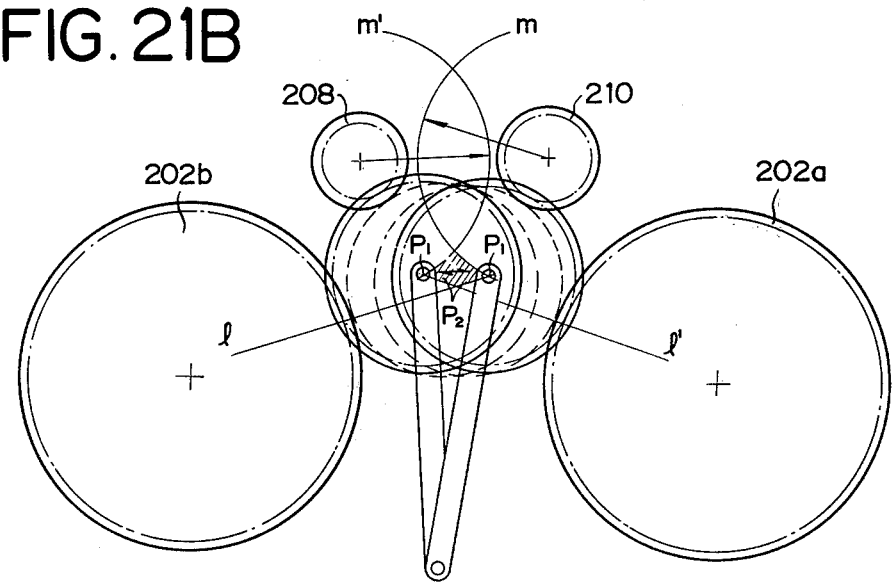

The locus of the reciprocating movement of the idler gear 211 may be curved as illustrated in FIG. 21(B) rather than linear as depicted in FIG. 21(A). Where two gear 211 and 211' having diameters different from each other and integrally formed each other are used as an idler gear to impart a speed change function to the gear as illustrated in FIG. 22, the locus of the idler gear is defined based on a state where each gears 211, 211' comprising the idler gear is in mesh with the drive gear and the reel rotating gear.

A mechanism for making the idler gear 211 reciprocate linearly according to the locus as mentioned above will now be described in detail referring to FIGS. 19 and 20. Numeral 212 designates a changeover plate disposed at a position outer than the drive gears 208, 210. This lever 212 is allowed to advance and retreat, namely, to move right and left as viewed in the figures by guide slots 213, 213 formed thereon and guide pins 214, 214 provided on the tape player body. A mounting plate 215 formed in the shape of heart is provided intermediate the changeover plate 212. A shaft of the idler gear 211 is fixed to the mounting plate 215 at a tip end thereof. The mounting plate 215 is formed with openings 216, 216 into which shafts of the drive gears 208, 210 are inserted, so that the shafts of the drive gears 208, 210 do not prevent the movement of the mounting plate 215 according to the advance or retreat of the changeover plate 212. The changeover plate 212 has a pair of stoppers 217, 217 which are projected from one side of the plate 212. A projection provided on the tape player body is adapted to engage with the stoppers 217, 217 to regulate the displacement distance of the changeover plate 212.

The changeover plate 212 is connected at an end thereof to driving means for displacing the changeover lever 212 forwardly or rearwardly. In the tape player as illustrated, a plunger is used as driving means.

In this respect, numeral 219 designates the plunger, 220 an actuator rod of the plunger 219, 221 a connecting rod suitably connected to the actuator rod 220, 222 a guide pin fixed to a tip end of the connecting rod 221, and 223 a spring provided between the guide pin 222 and the tape player body. This spring 223 acts to urge the actuator rod 220 so as to be normally pulled out of the plunger 219. A tip end of the actuator rod 220 carries a cam plate 224. The cam plate 224 has a guide slot 225 formed in a V-shape and the cam plate 224 is pivotally connected to the tape player body by a shaft 226 disposed on an axis of the movement of the actuator rod 220. The guide pin 222 is fitted in the guide slot 225 and adapted to engage alternatingly with tapered portions 225a and 225b to rock the cam plate 224 according to the reciprocating movement of the guide pin 22 by the driving of the plunger 219. When the plunger 219 is not energized, the guide pin 222 returns to a standby position by the action of a spring 223 in preparation for next operation. For example, in the case as illustrated in FIG. 19, the guide pin 222 is located at a suitable portion in the slot 225 for engaging with the tapered portion 225 to change the tape transport direction to the reverse direction.

The tip end of the cam pleate 224 is connected to an actuating lever 228 through a changeover plate 227 for the pinch rollers, and a tip end of the actuating lever 228 is connected to one end of the changeover lever 212, so that the changeover lever 212 will reciprocate rightwardly and leftwardly according to the reciprocating movement of the actuating lever 228 caused by the actuation of the plunger 219.

Stated illustratively, an engaging pin 230 provided at the tip end of the cam plate 224 is loosely fitted in an elongated slot 229 formed at an end portion of the changeover plate 227 to displace the changeover plate 227 leftwardly and rightwardly in association with the rocking of the cam plate 224. To regulate the displacement direction of the changeover plate 227, an elongated guide slot 231 is formed on the changeover plate 227 and a guide pin 232 is fitted in the slot 231. The actuating lever 228 is connected to the changeover plate 227 perpendicularly to the length of the changeover plate 227 and adjacently to a position where the changeover plate 227 and the cam plate 224 are connected each other. A pin 233 provided on the changeover plate 227 is engaged with a diagonal slot 234 formed at an end portion of the actuating lever 228, so that the pin 233 will move within the slot 234, according to the displacement of the changeover plate 227, to displace the actuating lever 228 in the transverse direction of the tape player. Numerals 235, 235 designate elongated guide slots formed on the actuating lever 228 and 236, 236 guide pins provided on the tape player body.

The actuating lever 228 is connected to the changeover lever 212 through a bell-crank lever 237. The bell-crank lever 237 acts to change the transverse movement of the actuating lever 228 into the longitudinal movement of the changeover lever 212. More specifically, the bell-crank lever 228 has a crooked portion which is pivotally connected to the tape player body by a shaft and has an end at which an engaging pin 239 is provided. The engaging pin 239 is engaged with a slot 240 formed at an end portion of the actuating lever 228 to rock the bell-crank lever 237 according to the transverse movement of the actuating lever 228. The bell-crank lever 237 further has a wire spring 241 formed in a U-shape. Ends 241a, 241b of the wire spring 241 are so adapted that they encompass a projection 242 formed at an end portion of the changeover lever 212 therebetween. Therefore, according to the rocking of the bell-crank lever 237, the ends 241a, 241b of the spring 241 pushes the projection 242 alternatingly to displace the changeover lever 212 to and fro. In this case, it is preferred that the crooked angle of the spring 241 fixed to the bell-crank lever 237 be smaller than an angle defined by sidewalls 237a, 237b of the bell-crank lever 237. According to this arrangement, only the spring 241 acts to displace the changeover lever 212 under normal conditions, but when a strong force is required to effect the displacement of the changeover lever 212, the sidewalls 237a, 237b of the bell-crank lever 237 are brought into contact with the spring 241 so that the spring 241 effects the displacement of the changeover lever 212 in cooperation with the bell-crank lever 237.

The displacement direction changeover means as mentioned above may be connected directly to the changeover lever 212, without providing the changeover plate 227 and the actuating lever 228, if the positional relationship between the plunger 219 and the changeover lever 212 is suitably established.

There is now described means for switching operation between the forward pinch roller and the reverse pinch roller achieved according to the movement of the changeover plate 227 simultaneously with the switching over of the idler gear.

In FIGS. 19 and 20, numerals 243a, 243b designate a forward and a reverse capstan shaft, respectively, 244a, 244b a forward and a reverse pinch roller, respectively, and 245a, 245b pinch roller holders. Each pinch roller holder 245a or 245b is pivotally mounted on the tape player body, and pinch rollers 244a, 244b are urged towards the capstan shafts 243a, 243b, respectively, by means of springs 246a, 246b provided between the pinch roller holders 245a, 245b and the tape player body, respectively. On the other hand, guide rollers 247a, 247b are provided on the pinch roller holders 245a, 245b and engaged with guide portions 248a, 248b formed on the changeover plate 227. The guide portions 248a, 248b formed on the changeover plate 227 have such configurations that when the guide rollers 247a, 247b are located at inner ends of the corresponding guide portions 248a, 248b, respectively, the pinch rollers 244a, 244b are pressed against the capstan shafts 243a, 243b, respectively, and that only one of the guide rollers may be located at the inner end of the guide portion and the other is located at an outer end of the guide portion at one time during the movement of the changeover plate 227.

The changeover plate 227 further has an ejecting plate contacting portion 249 which serves to normally put the changeover plate 227 into the forward mode (a state as illustrated in FIG. 19) during the cassette ejecting operation. More specifically, even when the tape is fed in the reverse mode and the changeover plate 227 is advanced into the reverse position (a position as illustrated in FIG. 20), upon depression of an ejecting plate (not shown) for removal of the cassette pack, a certain portion of the ejecting plate pushes the contacting portion 249 of the changeover plate 227 to displace the changeover plate 227 to the forward position. According to the displacement of the ejecting plate 227, the pinch rollers and idler gear switching mechanism associated with the ejecting plate 227 are also put into the respective forward positions. Thus, the tape can surely start in the forward direction without failure whenever a cassette tape is loaded.

The idler gear switching mechanism as disclosed and illustrated will operate as follows:

FIG. 19 illustrated a forward mode wherein the forward reel 201a is used as a takeup reel and the various components are set so that the tape is fed in the forward direction. In this mode, the changeover lever 212 is moved rightwardly as viewed in the figure and the idler gear 211 mounted on the changeover lever 212 through the mounting plate 215 is in mesh with the forward drive gear 210 and the forward reel rotating gear 202a. It will then be appreciated that the forward reel 201a is driven by the motor, through the belt 206, the transmission gear 207, the follower gear 209, the forward drive gear 210, the idler gear 211 and the forward reel rotating gear 202a, to rotate in the direction of an arrow shown in the figure.

In association with the aforesaid operation, the pinch roller changeover plate is moved rightwardly in the figure and the forward pinch roller 244a is pressed against the capstan shaft 243a to transport the tape towards the forward reel 201a.

The tape player starts a recording/reproducing operation under these set conditions, and when the tape ends, the rotation of the reels 201a, 201b is stopped. The stopping of the reels 201a, 201b is detected by suitable reel stopping detecting means (not shown), and an electrical signal is generated upon detection of the stopping and applied to the plunger 219. When the plunger 219 is energized by the electrical signal, the connecting rod 221 is attracted thereto to bring the guide pin 222 fixed to the connecting rod 221 into contact with the tapered portion 225b of the V-shaped guide slot 225 and pull the guide pin 222 along the tapered portion 225b into an end of the guide slot 225. When the guide pin 222 is further pulled by the plunger 219, the cam plate 224 is rotated clockwise around the shaft 226 by the guide pin 222 into a position as illustrated in FIG. 20. Upon the rotation of the cam plate 224, the pinch roller changeover plate 227 is displaced leftwardly in the figure through the connecting mechanism comprising the engaging pin 230 and the slot 229, to release the pressing by the forward pinch roller against the capstan shaft 243a and concurrently to bring the reverse pinch roller 245b into contact with the capstan shaft 243b (refer to FIG. 20).

At the same time, the engaging pin 233 provided on the changeover plate 227 is moved leftwardly within the diagonal slot 234, so that the actuating lever 228 is displaced and the bell-crank lever 237 connected to the actuating lever 228 is rocked to move the changeover lever 212 along the length thereof. Following the displacement of the changeover lever 212, the idler gear 211 mounted on the mounting plate 215 disengages from the forward drive gear 210 and the forward reel rotating gear 202a and comes to contact the reverse drive gear 208 and the reverse reel rotating gear 202b. At this time, since the locus of the idler gear 211 takes a course away, towards the drive gear 208, from the l' which connects the center P₁ of the idler gear 211 when the intermeshing pitch circles of the idler gear 211, the drive gear 208 and the reel rotating gear 202b are in contact with each other and the center P₂ of the idler gear 211 when the addendum circles of the three gears are in contact with each other, the idler gear 211 is first brought into mesh with the reverse drive gear 208 to rotate the gear 211 and then the idler gear 211 now being rotating is meshed with the reverse reel rotating gear 202b to rotate the same. Thus, the tape is taken up by the reverse reel 201b and transported in the reversed direction to continue the recording/reproducing operation.

When the tape ends in the reverse feed mode, the plunger 219 is again energized to switch the set conditions of the mechanism from the state as illustrated in FIG. 20 to the forward feed mode as illustrated in FIG. 19 for further recording/reproducing. In this case, the idler gear 211 is also put into mesh with the forward drive gear 210 and the forward reel rotating gear 202a in the sequence. The idler gear 211 will never come to contact the reel rotating gear 202a prior to meshing with the drive gear 210.

The set position of the changeover lever 212 in the state as illustrated in FIGS. 19 and 20 is positively maintained by the action of the wire spring 241 secured to the bell-crank lever 237 to assure snug mesh between the gears.

In the embodiment as illustrated, for putting the idler gear 211 into mesh with the drive gear 210, 208 and the reel rotating gear 202a, 202b, the idler gear 211 approaches the drive gear 210, 208 along the rotation direction of the drive gear 210, 208 (approaches from the left in the figures to the forward drive gear 210 which rotates counterclockwise and approaches from the right in the figures to the reverse drive gear 208 which rotates clockeise). Therefore, the idler gear 211 is automatically attracted to the drive gear 210, 208 and the reel rotating gear 202a, 202b by the forces given by the gears during the rotation transmission, thereby to further assure proper mesh between the gears. More specifically, when the gears are disposed as illustrated, in a state where the idler gear 211 is set in the forward mode, a force $f_1$ is exerted between the forward drive gear 210 and the idler gear 211 which force acts to move the idler gear 211 in a direction at an angle corresponding to the complement of a pressure angle $\alpha$ (generally, 14° or 20°) from a line connecting the centers of the drive gear 210 and the idler gear 211 as illustrated in FIG. 23(A). Between the idler gear 211, and the forward reel rotating gear 202a, is also exerted a force acting to move, relative to the idler gear 211, the forward reel rotating gear 202a in the direction at an angle of the complement of the pressure angle $\alpha$ of the two gears. However, since the reel rotating gear 202a is fixed, a force $f_2$ having a direction opposite to that of the complement angle is applied to the idler gear 211 as a counterforce. Therefore, there is applied to the idler gear 211 a resultant force F of the force $f_1$ from the drive gear 210 and the force $f_2$ from the reel rotating gear 202a, so that the idler gear 211 is drawn into between the drive gear 210 and the reel rotating gear 202a to attain the intermeshing relations therebetween. On the other hand, when the idler gear 211 is set in the reverse mode, a similar force is applied to the idler gear 211 to ensure the intermeshing between the gears as illustrated in FIG. 23(B).

As mentioned in detail above, in the switching mechanism of this invention, the idler gear 211 is adapted to be first brought into mesh with the drive gear and then brought into mesh with the reel rotating gear being rotated in sequence for facilitating intermeshing therebetween, whether the idler gear is switched to the forward side or switched to the reverse side. Therefore, locking of the addenda caused when gears in stationary state are brought into mesh with each other as in known arts can be prevented. Since the switch over of the idler gear can be effected by a relatively small force but with accuracy, the application of the idler gear to an automatic reversible tape player, which has been considered impossible, can now be realized. As a result, the entire size and thickness of the switching mechanism can be much reduced than the known switching mechanism using a rubber idler roller and yet the stability of tape transport can be enhanced because the rotation of the motor is accurately and positively conveyed to the reels.

The tape player of the present invention preferably has an improved fast-forward/rewind mechanism which is capable of maintaining an operation state set by the fast-forward/rewind mechanism to continue a fast-forward mode or a rewind mode when a cassette is loaded, and yet capable of immediately cancel an operation state set by an inadvertent operation of the fast-forward/rewind mechanism, when the cassette is ejected, to restore a normal recording/reproducing mode.

It has been widely known to provide, in a fast-forward/rewind mechanism of a cassette tape recording/reproducing apparatus, a holding mechanism for holding an operation state such as a fast-forward mode or a rewind mode until the fast-forward operation or the rewind operation is completed or another operation is effected to stop the operation of the mechanism, once the fast-forward/rewind mechanism is operated. Especially in a car tape recording/reproducing apparatus, it is inconvenient and dangerous to keep on pressing an operating lever of the fast-forward/rewind mechanism until the fast-forward or rewind operation is completed, and the provision of the holding mechanism for maintaining the operation state of the fast-forward/rewind mechanism is indispensable in such a car apparatus.

However, a known holding mechanism provided in a tape recording/reproducing apparatus has such a disadvantage that it operates whether a cassette is loaded or not, and accordingly, if the fast-forward/rewind mechanism is inadvertently operated in a state where the cassette is ejected, the tape recording/reproducing apparatus is kept in the fast-forward mode or the rewind mode until the operating condition is cancelled by an operator of the apparatus. Where the cassette is loaded in the tape recording/reproducing apparatus preliminarily set in the fast-forward or the rewind mode, recording/rewind operation is not effected immediately. Furthermore, there is a possibility of break or entwinement of a tape resulting in eventual breakage of the cassette or of imposition of an overload onto the tape recording/reproducing apparatus causing various troubles therewith.

In this connection, this invention further contemplates a holding mechanism wherein lock pin position regulating means is engaged with a lock pin for holding the fast-forward/rewind mechanism in an operative position and the lock pin position regulating means is interlocked with an ejecting plate adapted to move backwardly or forwardly according to loading or unloading of the cassette, thereby to keep the lock pin from moving to a position operative to hold an operating condition of the fast-forward/rewind mechanism by checking the lock pin with the regulating means in a state where the cassette is ejected.

Figure 24A:
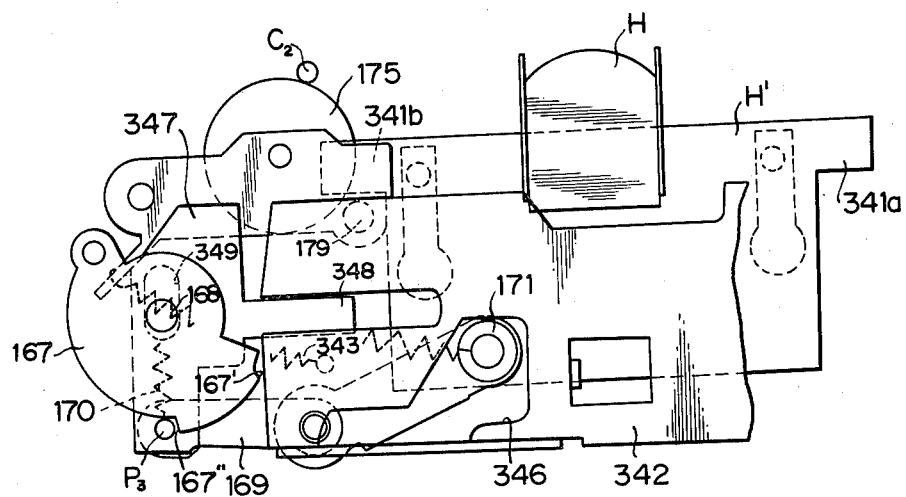
FIGS. 24(A) and (B) are plan views of one form of a holding mechanism suitably incorporated in the fast-forward/rewinding drive mechanism shown in FIGS. 15 to 18.
Figure 24B:
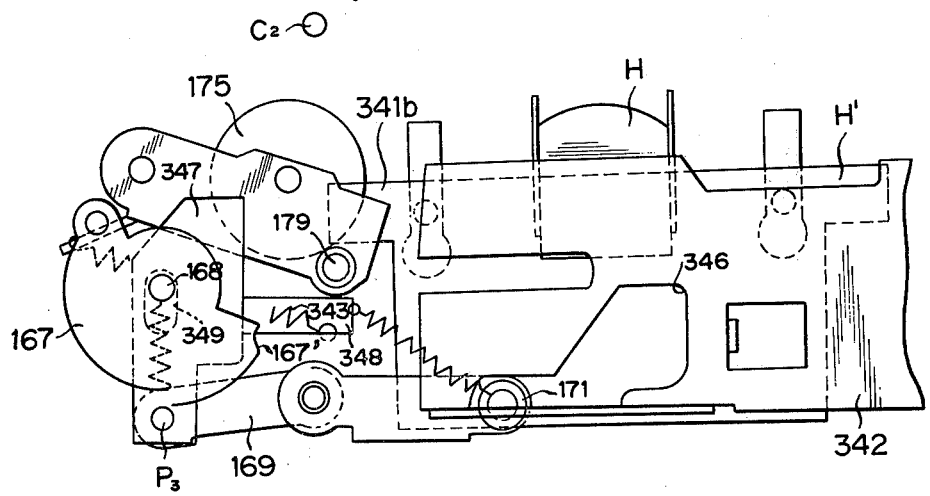

In a first form of the holding mechanism as illustrated in FIGS. 24(A) and (B), a lock plate 347 is movably mounted on a tape player body. A forward end of the lock plate 347 is connected to a lock pin $P_3$ which is provided for a changeover plate 167, and another end thereof is provided with an engaging projection 348. This engaging projection 348 is adapted to engage with a guide roller 179 of a reverse pinch roller 175 only when the guide roller 179 is retired from a capstan $C_2$.

To mount the lock plate 347 on the player body, the lock plate 347 is formed with an elongated slot 349 and a shaft 168 of the changeover plate 167 is loosely fitted in the slot 349 so that the plate 347 may reciprocate along the slot 349.

The so constructed holding mechanism will operate as follows:

First, when the cassette is loaded, an ejecting plate 342 is urged by a spring 343 into an advanced position thereof, so that a head plate guide roller 171 is moved to an inner end of a guide cutout 346 formed on the ejecting plate 342 and a head plate H' is advanced towards the cassette. The reverse pinch roller 175 which has been restrained by a projection 341b of the head plate H' is also advanced by the action of a spring to be pressed against a capstan $C_2$. In this state, the guide roller 179 of the pinch roller 175 is not engaged with the engaging projection 348 of the engaging plate 347. Therefore, the lock plate 347 and the lock pin $P_3$ connected thereto are not restrained by the guide roller 179 and movable freely. In this connection, it is to be noted that since the lock pin $P_3$ is urged by a spring 170 towards the changeover plate 167, the lock pin $P_3$ is brought into engagement with shoulder portion 167' or 167" by the action of the spring 170 to prevent the rotation of the changeover plate 167 when an operating lever $L_1$ is turned to rotate the changeover plate 167 for fast-forward or rewind operation.

On the other hand, when the operating lever $L_1$ is depressed to push the ejecting plate 342 rearwardly for cassette ejection, the head plate guide roller 171 now moved to an outer end of the guide cutout 346 of the ejecting plate 342 acts to retire the head plate H' away from the cassette and disengage the pinch roller 175 from the capstan $C_2$ in association with the head plate H'. Then, the guide roller 179 of the pinch roller 175 is brought into engagement with the engaging projection 348 of the lock plate 347 to lock the lock plate 347 and the lock pin connected thereto.

In the so arranged mechanism, it will be seen that if the operating lever $L_1$ is inadvertently operated or thrown into the fast-forward mode or the rewind mode when the cassette is ejected, the lock pin $P_3$ does not engage with either of the engaging shoulders 167', 167" of the changeover plate 167 so that the changeover plate 167 is immediately restored to its original position by the pushing force of a head releasing plate 172 which is in contact with the changeover plate 176 through pins $P_4$, $P_4$. Thus, the fast-forward mode or the rewind mode is released and a normal operation mode is restored.

Figure 25A:
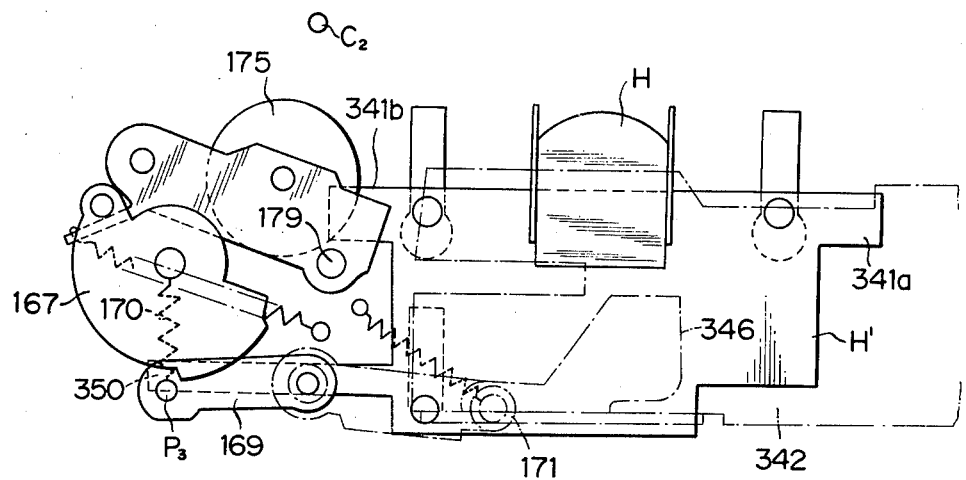
FIGS. 25(A) and (B) are a plan view and a side elevational view, respectively, of another form of holding mechanism.

In another form of the holding mechanism as shown in FIGS. 25(A) and (B), an engaging projection 350 is formed on a head plate H', which projection 350 extends over a lock pin $P_3$ from the head pin 350. The engaging projection 350 is adapted to abut against an extension portion 351 of the lock pin $P_3$ only when the head plate H' is retired. In the holding mechanism as illustrated, a changeover plate 167 engageable with the lock pin $P_3$ is disposed at an upper portion of a lock pin mounting frame 169, while the head plate H' is disposed at a lower portion thereof, and therefore the lock pin $P_3$ is provided on a top face of the mounting frame 169 and the extention portion 351 of the lock pin is extended to the bottom of the mounting frame 169.

Figure 25B:
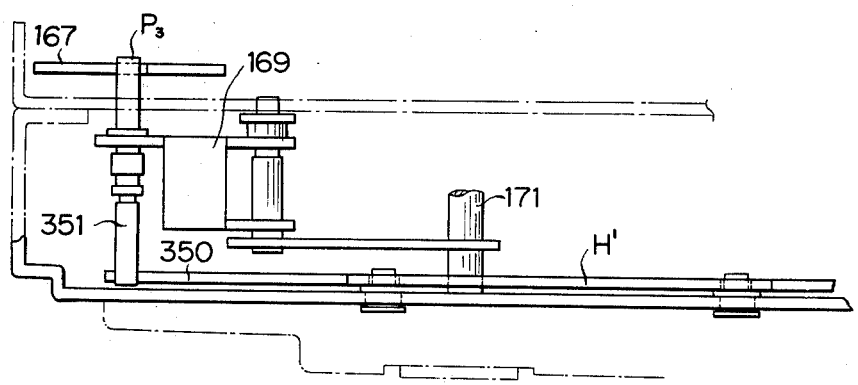

In the second form of the holding mechanism, when the cassette is loaded, an ejecting plate 342 is advanced as illustrated in FIG. 25(A) and a head plate guide roller 171 is guided by a guide cutout formed on the ejecting plate 171 so as to advance a head plate H' towards a cassette tape. Accordingly, in this position, the extension portion 351 of the lock pin $P_3$ is released from the engaging projection 350 formed on the head plate H'. The lock pin $P_3$ is then allowed to move freely towards the changeover plate 167 without being subjected to regulation by the engaging projection 350. If the operating lever $L_1$ is operated in this state to set the fast-forward/rewind mechanism into an operable condition, the lock pin $P_3$ is brought into engagement with an engaging portion 167' or 167" of the changeover plate 167 to hold the set operating condition. On the other hand, when the cassette is ejected and the ejecting plate 342 is retired as illustrated in FIG. 25(B), the head plate H' is caused to retreat by means of the guide cutout 346 and the head plate guide roller 171. Accordingly, the engaging projection 350 formed on the head plate H' is brought into engagement with the extension portion 351 of the lock pin $P_3$ to regulate a movement of the lock pin $P_3$ towards the changeover plate 176. Therefore, if the operating lever $L_1$ is thrown into the fast-forward mode or the rewind mode, the lever $L_1$ returns immediately to an original recording/reproducing mode.

Figure 26A:
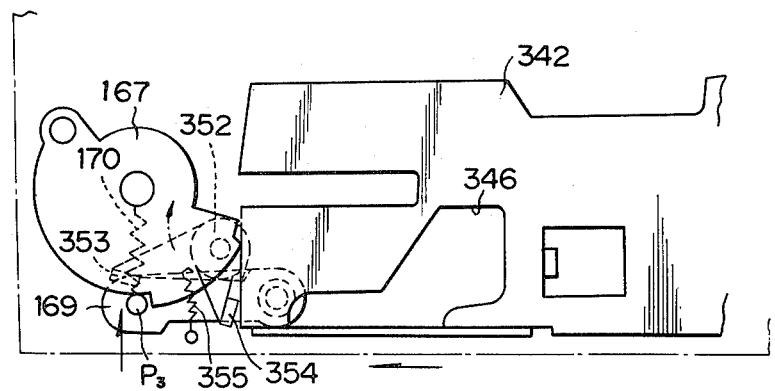
FIGS. 26(A) and (B) are plan views of a still another form of holding mechanism.

A third form of the holding mechanism has such an arrangement as illustrated in FIGS. 26(A) and (B). An L-shaped lock pin regulating lever 352 is provided in the vicinity of a lock pin $P_3$ and pivotally supported at its bent portion on a tape player body. The regulating lever 352 has, at an end thereof, a stopper 353 which is adapted to abut against the lock pin $P_3$ on a changeover plate side thereof. The lever 353 has, at another end thereof, a pushing member 354 which is adapted to abut against a forward end of an ejecting plate 342 when the plate 342 is pushed forwardly. Between the regulating lever 352 and the tape player body is mounted a spring 355 to normally urge the regulating lever 352 counter-clockwise as viewed in the figures so that the stopper 353 pushes the lock pin in the direction opposite to the changeover plate 167. The spring 355 of the regulating lever 352 is stronger than a spring 170 urging the lock pin $P_3$ towards the changeover plate 167.

Figure 26B:
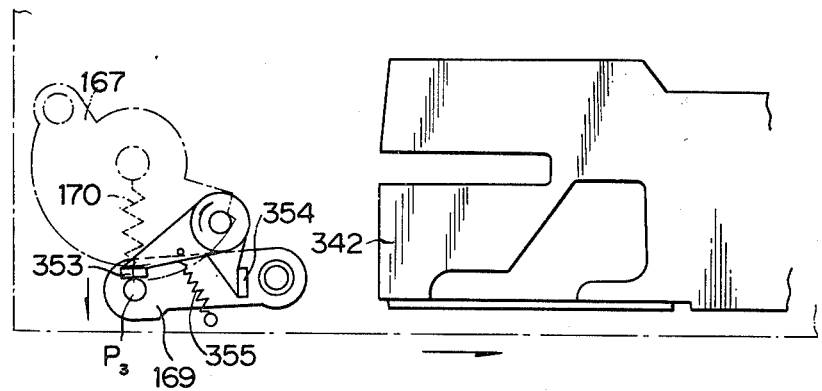

According to the arrangement of the third form of the holding mechanism, when the cassette is loaded, if the ejecting plate 342 is advanced as illustrated in FIG. 26(A), the regulating lever 352 is pushed by the pushing member 352 brought into engagement with the ejecting plate 342 and then rotated clockwise against the action of the spring 355. As a result, the stopper 353 provided at the end portion of the regulating lever 352 is disengaged from the lock pin $P_3$. Then, the lock pin $P_3$ is allowed to engage with an engaging portion 167' or 167" of the changeover plate 167 by the action of the spring 170 connected thereto. Thus, the operating condition of the fast-forward/rewind mechanism is held. On the other hand, when the cassette is ejected, if the ejecting plate 342 is retired as illustrated in FIG. 26(B), the regulating lever 352 rotates in the opposite direction by the action of the spring 355 to press the lock pin $P_3$ by the stopper 353 thereof. Then, the lock pin $P_3$ is prevented from engaging with the engaging portion 167' or 167" of the changeover plate 167 and the fast-forward/rewind mechanism is not maintained in the set operating condition. In this case, though the lock pin $P_3$ is also urged towards the changeover plate 167 by the spring 170 connected thereto, the lock pin $P_3$ is locked because the force of the spring 355 of the regulating lever 352 for locking the pin $P_3$ is larger than that of the spring 170.

As mentioned above, according to the arrangement of the holding mechanism, the lock pin position regulating means is engaged with the lock pin for holding the operation state of the fast-forward/rewind mechanism, and interlocked with the ejecting plate which effects reciprocating movement according to loading and unloading of the cassette. Consequently, even if the fast-forward/rewind mechanism is operated when the cassette is ejected, the set operating condition is not maintained and a normal operating condition is immediately restored. Accordingly, the tape recording/reproducing apparatus is never set in the fast-forward mode or the rewind mode prior to a loading of a cassette, which facilitates the loading of the cassette and assure smooth and accurate loading thereof. In addition, after the cassette is loaded, the operating state of the fast-forward-/rewind mechanism is automatically locked to ensure continuous operation in the fast-forward mode or the rewind mode. Thus, the holding mechanism in accordance with the present invention is suitable especially for a car audio unit such as a car stereo etc.

We claim:

1. A cassette tape recording/reproducing apparatus which comprises:
    a guide member for guiding horizontally a recording-/reproducing cassette tape into the interior of said apparatus;
    an ejecting member and a slide member provided along a side of said guide member and movable in the forward and the backward direction of said apparatus;
    a lock member for locking said ejecting member and said slide member at their respective retired positions;
    means for allowing one of said ejecting member and said slide member to move backwardly and forwardly while the other is locked by said lock member;
    a power member provided along said side of the guide member and movable backwardly and forwardly;
    a set spring member for normally urging said power member in the retreating direction;
    means for disengageably connecting said slide member to said power member;
    means for releasing the connection between said slide member and said power member when the cassette tape is ejected;
    an ejecting spring member for normally urging said slide member in the advancing direction; and
    means interlocked with said ejecting member for moving said guide member in the vertical direction to set the cassette tape into and remove the same from a recording/reproducing position.

2. An apparatus of claim 1 wherein said ejecting member has, at an upper face thereof, and said slide member has, at a lower face thereof, lock pins, respectively, and said lock member is pivotally supported, at a rear portion thereof, on said ejecting member and formed with a pair of recessed portions in the vicinity of the pivotal support thereof, said recessed portions being engageable with said lock pins, respectively, to lock said ejecting member and said slide member at their respective retired positions.

3. An apparatus of claim 1 which further comprises a rack gear engageable with said slide member; a pinion gear meshable with said rack gear; and a pushing arm member pivotally connected to said pinion gear and disengageably connected at a tip end thereof to said power member.

4. An apparatus of claim 3 which further comprises a kick member pivotally mounted adjacently to said power member and adapted to abut, at an end thereof, against the tip end of said pushing arm member and adapted to be pushed, at another end thereof to release the connection between said pushing arm member and said power member when the cassette tape is ejected.

5. An apparatus of claim 1 which further comprises a guide arm member disposed over an upper face of said guide member and provided with a guide roller; said guide arm being swingable around a rear end portion thereof and flexibly connected at a forward end thereof to said guide member; and an inclined groove formed on said ejecting member for receiving said guide roller therein.

6. An apparatus of claim 1 which further comprises a recording/reproducing head; pinch rollers; and means for pressing the cassette tape against said head and said pinch rollers; said pressing means and said means for moving the guide member in the vertical direction being interlocked with said ejecting member to effect the vertical movement of said guide member and the movement of said head and pinch rollers relative to said cassette tape in a predetermined sequence.

7. An apparatus of claim 6 which further comprises a head plate on which said head is fixedly mounted and the entire of which is adapted to advance and retreat relative to the cassette tape; and a head plate guide roller interlocked with said head plate; said pinch rollers being adapted to advance and retreat relative to the cassette tape and engageable with said head plate; said ejecting member having a guide cutout with which said head plate guide roller is engaged; thereby to allow said head and said pinch rollers to press against or disengage from the cassette tape according to the advance or retreat of the head plate.

8. An apparatus of claim 1, which further comprises a cassette catch member slidable in the rearward and forward direction of said guide member and adapted to hold a rear end portion of the cassette inserted in the guide member; and wherein said means for moving the guide member in the vertical direction is adapted to operate when said cassette catch member is at a retired position thereof.

9. An apparatus of claim 8 which further comprises means for urging said slide member to retreat during the latter half of the retreating course of said member; and means for urging said slide member to advance when a cassette is ejected.

10. An apparatus of claim 8 wherein said cassette catch member has, at a side thereof, a projection and said slide member have a groove extending in the vertical direction and adapted to slidably receive said projection.

11. An apparatus of claim 8 wherein said slide member has a vertically extending protuberance and said cassette catch member has a groove to receive said protuberance therein for moving said cassette catch in the vertical direction along said protuberance.

12. An apparatus of claim 10 wherein said guide member has, at the upper face thereof, a slot extending along the length thereof and said cassette catch member has a top end slidably fitted in said slot.

13. An apparatus of claim 1 having a fast-forward/rewind mechanism which comprises:
a pair of capstans adapted to be rotated in opposite directions each other;
flywheels provided to said capstans, respectively;
gears provided to said flywheels, respectively;
a pair of reel turntables corresponding to said capstans, respectively;
reel turntable rotating gears provided on said reel turntables, respectively;
a fast-forward/rewind changeover lever;
a changeover gear plate interlocked with said lever;
a fast-forward/rewind changeover gear slidably provided through said changeover gear plate;
means interlocked with said changeover lever to displace said head; whereby, upon operation of said fast-forward/rewind changeover lever, said fast-forward/rewind changeover gear is brought into mesh with the gear of one of the flywheels and the reel turntable rotating gear associated therewith, and said head is moved by a given distance away from the recording/reproducing position.

14. An apparatus of claim 13 which further comprises a bell-crank lever engaged with said changeover gear plate and pivotally disposed between said changeover gear plate and said fast-forward/rewind changeover lever; and a spring provided at an end of said bell-crank lever and engaged with said changover gear plate.

15. An apparatus of claim 13 which further comprises locking means for locking a mode set upon operation of said fast-forward/rewind changeover lever.

16. An apparatus of claim 1 having an idler gear switching mechanism which comprises:
a forward drive gear;
a forward reel rotating gear adapted not to mesh directly with said drive gear;
a reverse drive gear adapted to rotate in the opposite direction to said forward drive gear;
a reverse reel rotating gear adapted not to mesh directly with said drive gear;
an idler gear adapted to reciprocate between the forward gears and the reverse gears; and
means for driving said idler gear to put the same into mesh with the forward drive gear and the forward reel rotating gear or the reverse drive gear and the reverse reel rotating gear for rotating the reel rotating gear by the drive gear;
said means being adapted to drive said idler gear to an intermeshing point between the idler gear, the drive gear and the reel rotating gear, so that said idler gear takes a locus away towards the drive gear from a line connecting a center of the idler gear when the intermeshing pich circles of said idler gear, drive gear and reel rotating gear are in contact with each other and a center of the idler gear when the addendum circles of said three gears are in contact with each other.

17. An apparatus of claim 16 wherein said idler gear driving means comprises:
a changeover lever provided outside the drive gears so as to move reciprocatably and having said idler gear fixed thereto;
means for switching over the direction of the movement of said changeover lever; and
changeover drive means engaged with said changeover lever through said means.

18. An apparatus of claim 17 wherein said movement direction switching-over means comprises a cam plate supported rockably and having a V-shaped guide slot and an engaging pin provided thereon; said changeover lever is adapted to slide in association with the rocking movement of said engaging pin; said changeover drive means has a guide pin fitted in said guide slot; and said cam plate is adapted to be rocked by a reciprocating movement of said guide pin.

19. An apparatus of claim 1 having a fast-forward/rewind mechanism which comprises:
a pair of lock means interlocked with said changeover lever;
a lock pin adapted to engage with either one of said lock means to maintain a fast-forward mode or a rewind mode;

means engageable with said lock pin to regulate the position thereof;

means for interlocking said means for regulating the position of the lock pin with the ejecting member, according to loading or unloading of the cassette tape so as to engage said position regulating means with said lock pin for restricting a movement of said lock pin towards said lock member.

20. An apparatus of claim 19 which further comprises a pair of pinch rollers each of which has a guide roller engaged with a head plate, and wherein said means for regulating the position of the lock pin includes a lock plate provided movably and connected at an end thereof to said lock pin and an engaging projection, said engaging projection being engageable with said guide roller of the pinch roller.

21. An apparatus of claim 19 wherein said means for regulating the position of the lock pin comprises an engaging projection extending from a head plate over said lock pin and engageable with an end of said lock pin.

22. An apparatus of claim 19 wherein said means for regulating the position of the lock pin comprises a regulating lever crooked into an L-shape adjacent to said lock pin and pivotally supported at the crooked portion, and a stopper provided at an end thereof; and which further comprises means for pressing said stopper against the lock pin; means for making an another end of said regulating lever abut against the ejecting member; and means for releasing the contact between said stopper and said lock pin according to the reciprocating movement of said ejecting member.

* * * * *